(12) United States Patent
Choi et al.

(10) Patent No.: US 11,907,062 B2
(45) Date of Patent: Feb. 20, 2024

(54) ERROR CHECK SCRUB OPERATION METHOD AND SEMICONDUCTOR SYSTEM USING THE SAME

(71) Applicant: SK hynix Inc., Icheon-si (KR)

(72) Inventors: Hee Eun Choi, Icheon-si (KR); Kwang Soon Kim, Icheon-si (KR); Ji Eun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 10 days.

(21) Appl. No.: 17/707,656

(22) Filed: Mar. 29, 2022

(65) Prior Publication Data

US 2023/0161665 A1 May 25, 2023

(30) Foreign Application Priority Data

Nov. 19, 2021 (KR) .................. 10-2021-0160809

(51) Int. Cl.
*G06F 11/00* (2006.01)
*G06F 11/10* (2006.01)

(52) U.S. Cl.
CPC .................. *G06F 11/106* (2013.01)

(58) Field of Classification Search
CPC .............. G06F 11/106; G06F 11/2278; G06F 11/2284; G06F 11/0727; G06F 11/073
See application file for complete search history.

(56) References Cited

U.S. PATENT DOCUMENTS

| | | | |
|---|---|---|---|
| 2014/0304566 A1* | 10/2014 | Henderson | G06F 1/3275 714/764 |
| 2017/0060681 A1* | 3/2017 | Halbert | G06F 11/1068 |
| 2017/0269979 A1* | 9/2017 | Gollub | G06F 11/076 |
| 2018/0150350 A1* | 5/2018 | Cha | G06F 11/1016 |
| 2018/0173588 A1* | 6/2018 | Bacchus | G06F 11/106 |
| 2020/0019462 A1 | 1/2020 | Prather et al. | |
| 2020/0034228 A1* | 1/2020 | Pawlowski | G06F 11/1004 |
| 2022/0139482 A1* | 5/2022 | Kim | G06F 11/1068 714/719 |
| 2023/0044318 A1* | 2/2023 | Shen | G06F 11/1068 |

FOREIGN PATENT DOCUMENTS

| | | |
|---|---|---|
| KR | 1020180009076 A | 1/2018 |
| KR | 1020180106494 A | 10/2018 |

* cited by examiner

*Primary Examiner* — Joseph D Manoskey
(74) *Attorney, Agent, or Firm* — William Park & Associates Ltd.

(57) ABSTRACT

A semiconductor system includes a controller configured to count the number of error check scrub (ECS) operations and configured to generate ECS information that includes information with regard to an address at which the ECS operation is to be performed based on the number of ECS operations. The semiconductor system further includes a memory apparatus configured to perform the ECS operation on a region that is selected by the ECS information.

21 Claims, 21 Drawing Sheets

ERROR CHECK SCRUB OPERATION METHOD AND SEMICONDUCTOR SYSTEM USING THE SAME

CROSS-REFERENCE TO RELATED APPLICATION

The present application claims priority under 35 U.S.C. § 119(a) to Korean application number 10-2021-0160809, filed in the Korean Intellectual Property Office on Nov. 19, 2021, the entire disclosure of which is incorporated herein by reference in its entirety

BACKGROUND

The present disclosure relates to an error check scrub (hereinafter referred to as "ECS") operation method of performing an ECS operation from a location of a memory apparatus at which an ECS operation has been previously performed after the start of an ECS operation and a semiconductor system using the same.

In order to increase the operating speed of a semiconductor apparatus, various methods of inputting and outputting data including multiple bits every clock cycle, etc. are being used. If the input/output speed of data is increased, a separate apparatus and method for guaranteeing the reliability of data transmission are additionally required because the probability that an error may occur during a process of transmitting the data is increased.

For example, a method of guaranteeing the reliability of data transmission is used by generating an error code capable of checking whether an error has occurred every data transmission and transmitting the error code along with the data. The error code includes an error detection code (EDC) capable of detecting an occurred error, an error correction code (ECC) capable of autonomously correcting an error when the error occurs, etc.

A semiconductor apparatus, such as a DRAM, performs an ECS operation of detecting a location at which data having an error is stored and preventing the occurrence of an error. The ECS operation is performed on all regions in which data of a core circuit is stored through an operation of correcting an error of data and re-storing the data by using an error correction code. The ECS operation may be sequentially performed on all regions in which data is stored.

SUMMARY

In an embodiment, a semiconductor system may include a controller configured to count the number of error check scrub (ECS) operations and generate ECS information that includes information with regard to an address at which the ECS operation is to be performed based on the number of ECS operations, and a memory apparatus configured to perform the ECS operation on a region that is selected by the ECS information.

In an embodiment, a semiconductor system may include a controller configured to receive error check scrub (ECS) information from a memory apparatus, store the ECS information, and generate ECS resume information that includes information with regard to an address at which an ECS operation is to be performed based on the ECS information, and a memory apparatus configured to generate the ECS information that includes information with regard to an address at which the ECS operation has been performed based on a command and sequentially perform the ECS operation from a region that is selected by the ECS resume information.

Furthermore, in an embodiment, an error check scrub (ECS) operation method may include performing, by a memory apparatus, an ECS operation and storing, in a controller, ECS information that includes information with regard to an address at which the ECS operation has been performed before the end of a power-off operation, and performing, by the memory apparatus, the ECS operation on a selected region based on the ECS information after the start of a boot-up operation.

Furthermore, in an embodiment, an error check scrub (ECS) operation method may include performing, by a memory apparatus, an ECS operation and transmitting, to a controller, ECS information that includes information with regard to an address at which the ECS operation has been performed before the end of a power-off operation, and outputting, to the memory apparatus, ECS resume information that is generated based on the ECS information stored in the controller and performing the ECS operation after the completion of a boot-up operation of the memory apparatus based on the ECS resume information.

DETAILED DESCRIPTION

Figure 1:
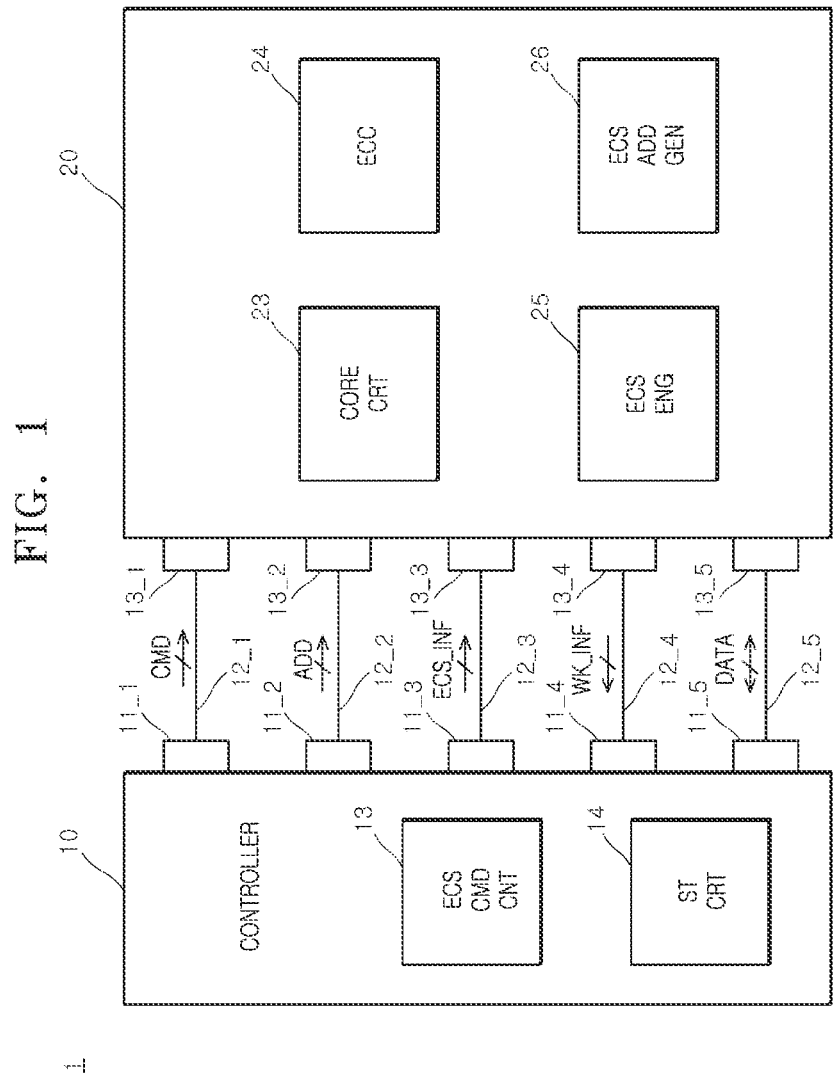
FIG. 1 is a block diagram illustrating a configuration of a semiconductor system in some embodiments of the present disclosure.

In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed.

Terms such as "first" and "second", which are used to distinguish among various components, are not limited by the components. For example, a first component may be referred to as a second component, and vice versa.

When one component is re erred to as being "coupled" or "connected" to another component, it should be understood that the components may be directly coupled or connected to each other or coupled or connected to each other through another component interposed therebetween. On the other hand, when one component is referred to as being "directly coupled" or "directly connected" to another component, it should be understood that the components are directly coupled or connected to each other without another component interposed therebetween.

A "logic high level" and a "logic low level" are used to describe the logic levels of signals. A signal having "logic high level" is distinguished from a signal having "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level in some embodiments, and a signal having a logic low level may be set to have a logic high level in some embodiments.

Hereafter, the teachings of the present disclosure will be described in more detail through embodiments. The embodiments are only used to exemplify the teachings of the present disclosure, and the scope of the present disclosure is not limited by the embodiments.

Some embodiments of the present disclosure are directed to providing an ECS operation method of performing an ECS operation from a location of a memory apparatus at which an ECS operation has been previously performed by storing, in a non-volatile apparatus, a location of the memory apparatus at which an ECS operation has been performed after the start of a power-off operation and providing the memory apparatus with a location of the memory apparatus at which an ECS operation has been performed and which has been stored after the start of a boot-up operation, and a semiconductor system using the same.

According to the present disclosure, it is possible to prevent an ECS operation from being repeated only at a specific address or omitted at some addresses in a way to perform an ECS operation from a location of a memory apparatus at which an ECS operation has been previously performed by storing, in a non-volatile apparatus, a location of the memory apparatus at which an ECS operation has been performed after the start of a power-off operation and providing the memory apparatus with a location of the memory apparatus at which an ECS operation has been performed and which has been stored after the start of a boot-up operation.

Furthermore, according to the present disclosure, there is an effect in that the reliability of data that is stored in the core circuit can be secured by performing an ECS operation from a location of a memory apparatus at which an ECS operation has been previously performed after the start of an ECS operation.

As illustrated in FIG. 1, a semiconductor system 1, in some embodiments of the present disclosure, may include a controller 10 and a semiconductor apparatus 20.

The controller 10 may include a first control pin 11_1, a second control pin 11_2, a third control pin 11_3, a fourth control pin 11_4, and a fifth control pin 11_5. The semiconductor apparatus 20 may include a first device pin 13_1, a second device pin 13_2, a third device pin 13_3, a fourth device pin 13_4, and a fifth device pin 13_5.

The controller 10 may transmit a command CMD to the semiconductor apparatus 20 through a first transmission line 12_1 that is coupled between the first control pin 11_1 and the first device pin 13_1. Each of the first control pin 11_1, the first transmission line 12_1, and the first device pin 13_1 may be implemented in plural based on the number of bits of the command CMD. The controller 10 may transmit an address ADD to the semiconductor apparatus 20 through a second transmission line 12_2 that is coupled between the second control pin 11_2 and the second device pin 13_2. Each of the second control pin 11_2, the second transmission line 12_2, and the second device pin 13_2 may be implemented in plural based on the number of bits of the address ADD. The controller 10 may transmit error check scrub (ECS) information ECS_INF to the semiconductor apparatus 20 through a third transmission line 12_3 that is coupled between the third control pin 11_3 and the third device pin 13_3. Each of the third control pin 11_3, the third transmission line 12_3, and the third device pin 13_3 may be implemented in plural based on the number of bits of the ECS information ECS_INF. The controller 10 may receive weak cell information WK_INF from the semiconductor apparatus 20 through a fourth transmission line 12_4 that is coupled between the fourth control pin 11_4 and the fourth device pin 13_4. Each of the fourth control pin 11_4, the fourth transmission line 12_4 and the fourth device pin 13_4 may be implemented in plural based on the number of bits of the weak cell information WK_INF. The controller 10 may output data DATA to the semiconductor apparatus 20 or receive data DATA from the semiconductor apparatus 20 through a fifth transmission line 12_5 that is coupled between the fifth control pin 11_5 and the fifth device pin 13_5. Each of the fifth control pin 13_5, the fifth transmission line 12_5, and the fifth device pin 13_5 may be implemented in plural based on the number of bits of the data DATA.

The ECS information ECS_INF has been implemented to be transmitted to the semiconductor apparatus 20 through the third transmission line 12_3, but may be implemented to be transmitted to the semiconductor apparatus 20 through the first transmission line 12_1 through which the command CMD is transmitted and the second transmission line 12_2 through which the address ADD is transmitted in some embodiments. The weak cell information WK_INF has been implemented to be transmitted to the controller 10 through the fourth transmission line 12_4, but may be implemented to be transmitted to the controller 10 through the fifth transmission line 12_5 through which the data DATA is transmitted in some embodiments.

The controller 10 may include an ECS command counter (ECS CMD CNT) 13 and a storage circuit (ST CRT) 14.

The ECS command counter 13 may count the number of ECS operations based on the command CMD. The ECS command counter 13 may output, as the ECS information ECS_INF, storage addresses (SADD<1:M> in FIG. 2) that are generated based on the number of ECS operations. The ECS information ECS_INF may include information with regard to an address at which an ECS operation will be performed. The address information means information with regard to a region at which an ECS operation will be performed. The address information may be set as the storage addresses (SADD<1:M> in FIG. 2).

The storage circuit 14 may store counting signals (CNT<1:M> in FIG. 2), that is, the number of ECS operations before a power-off operation. The storage circuit 14 may output, as the storage addresses (SADD<1:M> in FIG. 2), counting signals (CNT<1:M> in FIG. 2) that are stored after the start of a boot-up operation. The storage circuit 14 may be implemented as a non-volatile apparatus in which counting signals (CNT<1:M> in FIG. 2) are stored after the start of a power-off operation. The storage circuit 14 may be implemented to be included in the controller 10. However, the storage circuit 14 may be implemented as a non-volatile apparatus that is provided outside of the controller 10 in some embodiments.

The controller 10 may count the number of ECS operations based on the command CMD. The controller 10 may output the ECS information ECS_INF that includes information with regard to an address at which an ECS operation will be performed based on the number of ECS operations. The controller 10 may store counting signals (CNT<1:M> in FIG. 2) that are generated by counting the number of ECS operations before a power-off operation. The controller 10 may output, as the ECS information ECS_INF, counting signals (CNT<1:M> in FIG. 2) that are stored after the start of a hoot-up operation. The ECS information ECS_INF) may be output by using the command CMD, the address ADD, or data DATA for performing a mode register read operation.

The memory apparatus 20 may include a core circuit (CORE CRT) 23, an error correction circuit (ECC) 24, an ECS engine (ECS ENG) 25 and an ECS address generation circuit (ECS ADD GEN) 26.

The core circuit 23 may store internal data (ID in FIG. 3), the error of which has been corrected, after outputting internal data (ID in FIG. 3) that is stored in the core circuit 23 after the start of an ECS operation.

The error correction circuit 24 may detect an error that is included in the internal data (ID in FIG. 3) after the start of an ECS operation. The error correction circuit 24 may correct an error that is included in the internal data (ID in FIG. 3) after the start of an ECS operation.

The ECS engine 25 may control an ECS operation based on the command CMD.

The ECS address generation circuit 26 may generate ECS addresses (ECS_ADD<1:M> in FIG. 3) that are sequentially counted after the start of an ECS operation based on the command CMD. The ECS address generation circuit 26 may generate the ECS addresses (ECS_ADD<1:M> in FIG. 3) that are sequentially counted from the same ECS addresses (ECS_ADD<1:M> in FIG. 3) as the ECS information ECS_INF after the start of a hoot-up operation based on the command CMD.

The memory apparatus 20 may perform an ECS operation based on the ECS addresses (ECS_ADD<1:M> in FIG. 3) that are sequentially up-counted after the start of an ECS operation. The memory apparatus 20 may receive the ECS information ECS_INF after the start of a boot-up operation and may perform an ECS operation based on the ECS addresses (ECS_ADD<1:M> in FIG. 3) that are sequentially up-counted from the same ECS addresses (ECS_ADD<1:M> in FIG. 3) as the ECS information ECS_INF.

Figure 2:
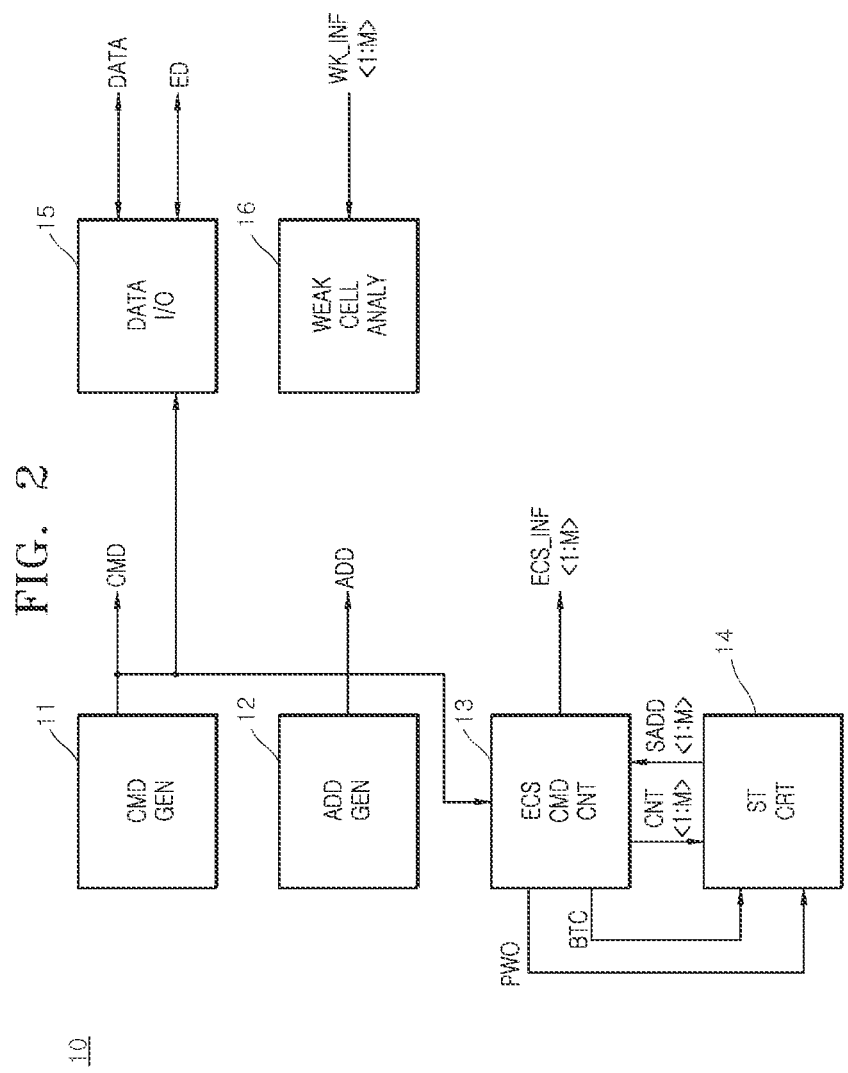
FIG. 2 is a block diagram illustrating a configuration of a controller included in the semiconductor system in some embodiments of the present disclosure, which is illustrated in FIG. 1.

FIG. 2 is a block diagram illustrating a configuration according an embodiment of the controller 10 that is included in the semiconductor system 1. The controller 10 may include a command generation circuit (CMD GEN) 11, an address generation circuit (ADD GEN) 12, the ECS command counter (ECS CMD CNT) 13, the storage circuit (ST CRT) 14, a data input and output circuit (DATA I/O) 15, and a weak cell analysis circuit (WEAK CELL ANALY) 16.

The command generation circuit 11 may generate the command CMD for controlling an operation of the memory apparatus 20. The command generation circuit 11 may generate the command CMD for performing a write operation and read operation of the memory apparatus 20. The command generation circuit 11 may generate the command CMD for performing an ECS operation of the memory apparatus 20. The command generation circuit 11 may generate the command CMD for performing a power-off operation of the memory apparatus 20. The command generation circuit 11 may generate the command CMD for performing a boot-up operation of the memory apparatus 20. The command generation circuit 11 may generate the command CMD for performing a mode register read operation and mode register write operation of the memory apparatus 20. Logic level combinations of the commands CMD for performing the write operation, the read operation, the ECS operation, the power-off operation, the boot-up operation, the mode register read operation, and the mode register write operation may be set as different logic level combinations. The command CMD has been illustrated as only one signal, but may be set to include multiple bits. The write operation and the read operation may be set as a normal operation of storing, by the memory apparatus 20, data DATA and inputting and outputting stored data DATA. The ECS operation may be set as an operation of correcting, by the memory apparatus 20, an error of data DATA through an error correction code (ECC) with respect to all regions in which the data DATA has been stored and re-storing the data DATA. The power-off operation may be set as an operation of providing notification that an operation of the memory apparatus 20 is terminated by blocking power that is supplied to the memory apparatus 20. The boot-up operation may be set as an operation of outputting information programmed in a fuse array (not illustrated) that is included in the memory apparatus 20. The mode register read operation may be set as an operation of outputting operation information stored in a register (not illustrated) that is included in the memory apparatus 20. The mode register write operation may be set as an operation of storing operation information in a register (not illustrated) that is included in the memory apparatus 20.

The address generation circuit 12 may generate the address ADD for performing a write operation or a read operation. The address generation circuit 12 may generate the address ADD for performing a write operation and read operation of the core circuit 23 that is included in the memory apparatus 20. The address ADD has been illustrated as only one signal, but may be set to include multiple bits.

The ECS command counter 13 may generate first to M-th counting signals CNT<1:M> that are counted by the number of ECS operations based on the command CMD. The ECS command counter 13 may generate a power-off control signal PWO after the start of a power-off operation based on the command CMD. The ECS command counter 13 may generate a boot-up control signal BTC after the start of a boot-up operation based on the command CMD. The ECS command counter 13 may output first to M-th storage addresses SADD<1:M> as first to M-th ECS information ECS_INF<1:M> after the start of a boot-up operation. The ECS command counter 13 may calculate first to M-th ECS information ECS_INF<1:M> for performing an ECS operation on a next location that is not the location of the memory apparatus 20 at which an ECS operation has been performed after the start of a boot-up operation and may output the first to M-th ECS information ECS_INF<1:M>. The ECS command counter 13 may be implemented to up-count first to M-th storage addresses SADD<1:M> once after the start of a boot-up operation and to output the first to M-th storage addresses SADD<1:M> as the first to M-th ECS information ECS_INF<1:M>. The operation of up-counting the first to M-th storage addresses SADD<1:M> is for performing an ECS operation on a next location that is not the location of the memory apparatus 20 at which an ECS operation has been previously performed.

The storage circuit 14 may store the first to M-th counting signals CNT<1:M> when receiving the power-off control signal PWO. The storage circuit 14 may output, as the stored first to M-th storage addresses SADD<1:M>, the first to M-th counting signals CNT<1:M> stored when the boot-up control signal BTC is received. The storage circuit 14 may be implemented as a non-volatile apparatus that maintains the first to M-th counting signals CNT<1:M> that are stored in the non-volatile apparatus after the start of a power-off operation. The storage circuit 14 has been implemented to be included in the controller 10, but may be implemented as a non-volatile apparatus that are provided outside of the controller 10 in some embodiments.

The data input and output circuit 15 may receive external data ED from an external apparatus (e.g., HOST) after the start of a write operation based on the command CMD. The data input and output circuit 15 may generate data DATA from the external data ED after the start of a write operation based on the command CMD. The data input and output circuit 15 may output the data DATA to the memory apparatus 20 after the start of a write operation based on the command CMD. The data input and output circuit 15 may receive data DATA from the memory apparatus 20 after the start of a read operation based on the command CMD. The data input and output circuit 15 may generate external data ED from the data DATA after the start of a read operation based on the command CMD. The data input and output circuit 15 may output the external data ED to an external apparatus (e.g., HOST) after the start of a read operation based on the command CMD.

The weak cell analysis circuit 16 may receive first to M-th weak cell information WK_INF<1:M> from the memory apparatus 20. The weak cell analysis circuit 16 may manage a failure that occurs in the memory apparatus 20 based on the first to M-th weak cell information WK_INF<1:M> that is received from the memory apparatus 20 after the start of a mode register read operation. The weak cell analysis circuit 16 may manage a failure of the core circuit 23 included in the memory apparatus 20 based on the first to M-th weak cell information WK_INF<1:M>. The weak cell analysis circuit 16 may manage a location of the memory apparatus 20 at which internal data (ID in FIG. 3), the error of which has been corrected is stored based on the first to M-th weak cell information WK_INF<1:M>. The weak cell analysis circuit 1 may control a repair operation of additionally refreshing a location of the memory apparatus 20 at which internal data (ID in FIG. 3), the error of which has been corrected is stored or changing a location of the memory apparatus 20 at which internal data (ID in FIG. 3), the error of which has been corrected is stored.

Figure 3:
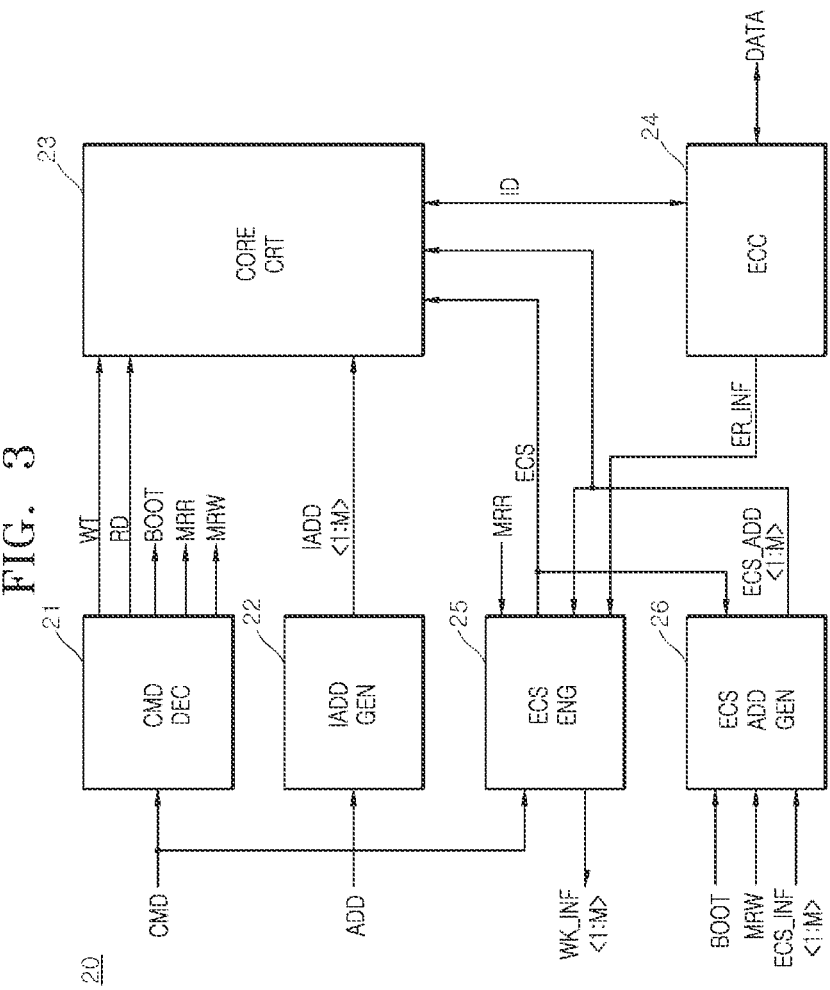
FIG. 3 is a block diagram illustrating a configuration of a semiconductor apparatus included in the semiconductor system in some embodiments of the present disclosure, which is illustrated in FIG. 1.

FIG. 3 is a block diagram illustrating a configuration according an embodiment of the memory apparatus 20 that is included in the semiconductor system 1. The memory apparatus 20 may include a command decoder (CMD DEC) 21, an internal address generation circuit (IADD GEN) 22, the core circuit (CORE CRT) 23, the error correction circuit (ECC) 24, the ECS engine 25 (ECS ENG), and an ECS address generation circuit (ECS ADD GEN) 26.

The command decoder 21 may generate a write command WT, a read command RD, a boot-up command BOOT, a mode register read command MRR, and a mode register write command MRW by decoding the command CMD. The command decoder 21 may generate the write command WT for performing a write operation, that is, a normal operation, by decoding the command CMD. The command decoder 21 may generate the read command RD for performing a read operation, that is, a normal operation, by decoding the command CMD. The command decoder 21 may generate the boot-up command BOOT for performing a boot-up operation by decoding the command CMD. The command decoder 21 may generate the mode register read command MRR for performing a mode register read operation by decoding the command CMD. The command decoder 21 may generate the mode register write command MRW for performing a mode register write operation by decoding the command CMD.

The internal address generation circuit 22 may generate first to M-th internal addresses IADD<1:M> by decoding the address ADD. The internal address generation circuit 22 may generate the first to M-th internal addresses IADD<1:

M> by decoding the address ADD after the start of a write operation or a read operation, that is, normal operations.

The core circuit 23 may store internal data ID at a location selected by the first to M-th internal addresses IADD<1:M> when receiving the write command WT. The core circuit 23 may output internal data ID that is stored at a location that is selected by the first to M-th internal addresses IADD<1:M> when receiving the read command RD. When receiving an ECS control signal ECS, the core circuit 23 may store internal data ID, the error of which has been corrected after outputting internal data ID that is stored at a location that is selected by first to M-th ECS addresses ECS_ADD<1:M.

The error correction circuit 24 may generate internal data ID by correcting an error that is included in data DATA after the start of a write operation. The error correction circuit 24 may generate data DATA by correcting an error that is included in internal data ID after the start of a read operation. If an error is included in internal data ID after the start of an ECS operation, the error correction circuit 24 may generate an error information signal ER_INF. The error correction circuit 24 may correct an error that is included in internal data ID output by the core circuit 23 after the start of an ECS operation, and may output, to the core circuit 23, the internal data ID having the error that is corrected. The error information signal ER_INF may include error-correctable information for internal data ID. For example, a case in which a 1-bit error occurs in internal data ID may indicate that the error is correctable, and a case in which an error having 2 bits or more occurs in internal data ID may indicate that the error is uncorrectable.

The ECS engine 25 may generate the ECS control signal ECS by decoding the command CMD. The ECS engine 25 may generate the ECS control signal ECS when receiving the command CMD having a logic level combination for performing an ECS operation during a normal operation. The ECS engine 25 may store the first to M-th ECS addresses ECS_ADD<1:M> when receiving the error information signal ER_INF during an ECS operation. The ECS engine 25 may store, in a mode register (252 in FIG. 5), the first to M-th ECS addresses ECS_ADD<1:M>, that is, row addresses, when receiving the error information signal ER_INF that is generated when a fail count that is generated in a row address is greater than a threshold value after the start of an ECS operation. The ECS engine 25 may output, as the first to M-th weak cell information WK_INF<1:M>, the first to M-th ECS addresses ECS_ADD<1:M> that are stored when the mode register read command MRR is received. The first to M-th weak cell information WK_INF<1:M> has been implemented to include the first to M-th ECS addresses ECS_ADD<1:M>, but may be implemented to include error occurrence information (e.g., 1-bit error occurrence information, 2-bit error occurrence information and error-uncorrectable information) of internal data ID.

The ECS address generation circuit 26 may generate the first to M-th ECS addresses ECS_ADD<1:M> sequentially up-counted when the ECS control signal ECS is received. The ECS address generation circuit 26 may receive the first to M-th ECS information ECS_INF<1:M> when receiving the boot-up command BOOT. The ECS address generation circuit 26 may generate the first to M-th ECS addresses ECS_ADD<1:M> sequentially up-counted from the first to M-th ECS addresses ECS_ADD<1:M> having the same logic level combination as the first to M-th ECS information ECS_INF<1:M> when receiving the ECS control signal ECS, after receiving the first to M-th ECS information ECS_INF<1:M>. The ECS address generation circuit 26 may generate the first to M-th ECS addresses ECS_ADD<1:M> that are selectively counted based on the number of mode register write commands MRW input to the ECS address generation circuit 26.

Figure 4:
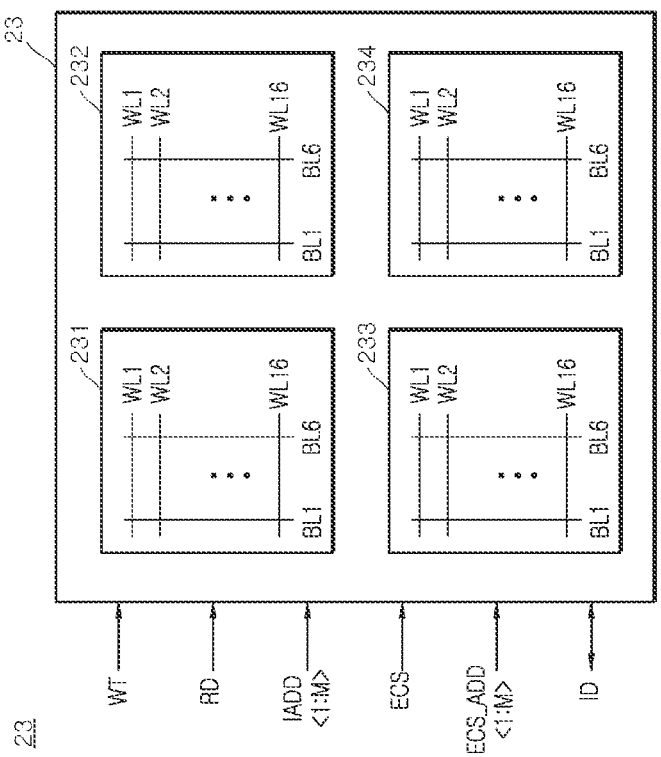
FIG. 4 is a block diagram illustrating a configuration of a core circuit included in the semiconductor apparatus in some embodiments of the present disclosure, which is illustrated in FIG. 3.

FIG. 4 is a block diagram illustrating a configuration in some embodiments of the core circuit 23 that is included in the memory apparatus 20. The core circuit 23 may include a first bank 231, a second bank 232, a third bank 233, and a fourth bank 234.

The first bank 231 may include first to sixteenth word lines WL1 to WL16 and first to sixth bit lines BL1 to BL6. The first bank 231 may store internal data ID in a memory cell (not illustrated) that is connected to a word line and bit line that is activated by first to M-th internal addresses IADD<1:M> when receiving the write command WT. The first bank 231 may output internal data ID that is stored in a memory cell (not illustrated) that is connected to a word line and bit line that is activated by the first to M-th internal addresses IADD<1:M> when receiving the read command RD. When receiving the ECS control signal ECS, the first bank 231 may store internal data ID, the error of which has been corrected, after outputting internal data ID that is stored in a memory cell (not illustrated) that is connected to a word line and bit line that is activated by the first to M-th ECS addresses ECS_ADD<1:M>. The first bank 231 has been implemented to include the sixteen word lines and the six bit lines, but may be implemented to include various numbers of word lines and bit lines in some embodiments.

Each of the second to fourth banks 232 to 234 is implemented as the same structure as the first bank 231 and performs the same operation as the first bank 231, and thus, a detailed description thereof is omitted.

Figure 5:
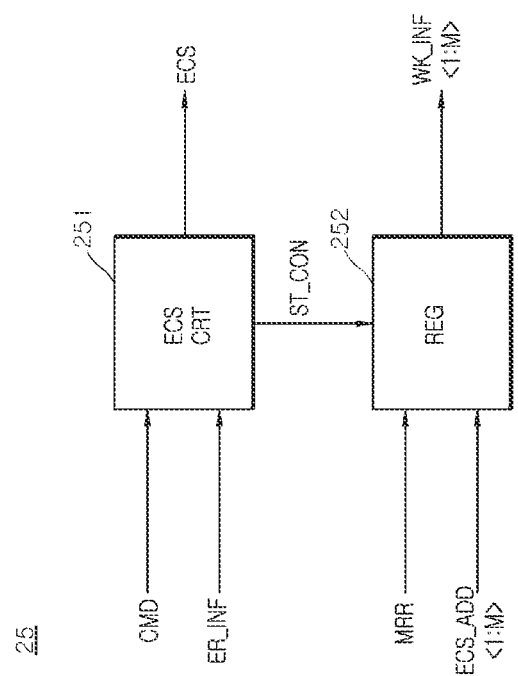
FIG. 5 is a block diagram illustrating a configuration of an ECS engine included in the semiconductor apparatus in some embodiments of the present disclosure, which is illustrated in FIG. 3.

FIG. 5 is a block diagram illustrating a configuration according an embodiment of the ECS engine 25 that is included in the memory apparatus 20. The ECS engine 25 may include an ECS control circuit (ECS CRT) 251 and a mode register (REG) 252.

The ECS control circuit 251 may generate the ECS control signal ECS by decoding the command CMD. The ECS control circuit 251 may generate the ECS control signal ECS for performing an ECS operation by decoding the command CMD. The ECS control circuit 251 may generate the ECS control signal ECS by decoding the command CMD during a normal operation. The ECS control circuit 251 may generate a storage control signal ST_CON based on the error information signal ER_INF.

The mode register 252 may store the first to M-th ECS addresses ECS_ADD<1:M> when receiving the storage control signal ST_CON. The mode register 252 may generate the first to M-th weak cell information WK_INF<1:M> from the first to M-th ECS addresses ECS_ADD<1:M> that are stored after the start of a mode register read operation. The mode register 252 may output, as the first to M-th weak cell information WK_INF<1:M>, the first to M-th ECS addresses ECS_ADD<1:M> that are stored when the mode register read command MRR is received. The mode register 252 may be implemented as a common register circuit that is implemented as multiple registers.

Figure 6:
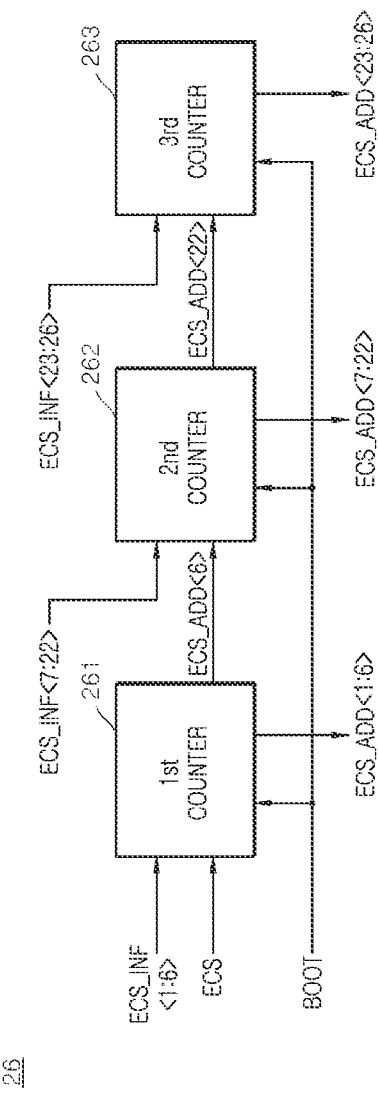
FIG. 6 is a block diagram illustrating a configuration of an ECS address generation circuit included in the semiconductor apparatus in some embodiments of the present disclosure, which is illustrated in FIG. 3.

FIG. 6 is a block diagram illustrating a configuration according an embodiment of the ECS address generation circuit 26 included in the memory apparatus 20. The ECS address generation circuit 26 may include a first counter 261, a second counter 262, and a third counter 263.

The first counter 261 may receive the ECS control signal ECS and may generate first to sixth ECS addresses ECS_ADD<1:6> that are sequentially up-counted. The first counter 261 may generate the first to sixth ECS addresses ECS_ADD<1:6> that are up-counted whenever the ECS control signal ECS is received. The first counter 261 may generate the first to sixth ECS addresses ECS_ADD<1:6> that are up-counted whenever a level of the ECS control signal ECS transitions from a logic high level to a logic low level. The first counter 261 may receive the boot-up command BOOT and the first to sixth ECS information ECS_INF<1:6> and may generate the first to sixth ECS addresses ECS_ADD<1:6>. The first counter 261 may receive the first to sixth ECS information ECS_INF<1:6> when receiving the boot-up command BOOT and may generate the first to sixth ECS addresses ECS_ADD<1:6> having the same logic level combination as the first to sixth ECS information ECS_INF<1:6>. The first counter 261 may sequentially up-count the first to sixth ECS addresses ECS_ADD<1:6> having the same logic level combination as the first to sixth ECS information ECS_INF<1:6> whenever the level of the ECS control signal ECS transitions from a logic high level to a logic low level after the boot-up command BOOT is received. The first to sixth ECS addresses ECS_ADD<1:6> may be set as bits for selecting the first to sixth bit lines BL1 to BL6 illustrated in FIG. 4.

The second counter 262 may receive the sixth ECS address ECS_ADD<6> and may generate seventh to twenty-second ECS addresses ECS_ADD<7:22> that are sequentially up-counted. The second counter 262 may generate the seventh to twenty-second ECS addresses ECS_ADD<7:22> that are up-counted whenever the sixth ECS address ECS_ADD<6> is received. The second counter 262 may generate the seventh to twenty-second ECS addresses ECS_ADD<7:22> that are up-counted whenever a level of the sixth ECS address ECS_ADD<6> transitions from a logic high level to a logic low level. The second counter 262 may receive the boot-up command BOOT and the seventh to twenty-second ECS information ECS_INF<7:22> and may generate the seventh to twenty-second ECS addresses ECS_ADD<7:22>. The second counter 262 may receive the seventh to twenty-second ECS information ECS_INF<7:22> when receiving the boot-up command BOOT and may generate the seventh to twenty-second ECS addresses ECS_ADD<7:22> having the same logic level combination as the seventh to twenty-second ECS information ECS_INF<7:22>. The second counter 262 may sequentially up-count the seventh to twenty-second ECS addresses ECS_ADD<7:22> having the same logic level combination as the seventh to twenty-second ECS information ECS_INF<7:22> whenever a level of the sixth ECS address ECS_ADD<6> transitions from a logic high level to a logic low level after the boot-up command BOOT is received. The seventh to twenty-second ECS addresses ECS_ADD<7:22> may be set as bits for selecting the first to sixteenth word lines WL1 to WL16 that are illustrated in FIG. 4.

The third counter 263 may receive the twenty-second ECS address ECS_ADD<22> and may generate twenty-third to twenty-sixth ECS addresses ECS_ADD<23:26> that are sequentially up-counted. The third counter 263 may generate the twenty-third to twenty-sixth ECS addresses ECS_ADD<23:26> up-counted whenever the twenty-second ECS address ECS_ADD<22> is received. The third counter 263 may generate the twenty-third to twenty-sixth ECS addresses ECS_ADD<23:26> up-counted whenever the level of the twenty-second ECS address ECS_ADD<22> transitions from a logic high level to a logic low level. The third counter 263 may receive the boot-up command BOOT and the twenty-third to twenty-sixth ECS information ECS_INF<23:26> and may generate the twenty-third to twenty-sixth ECS addresses ECS_ADD<23:26>. The third counter 263 may receive the twenty-third to twenty-sixth ECS information ECS_INF<23:26> when receiving the boot-up command BOOT and may generate the twenty-third to twenty-sixth ECS addresses ECS_ADD<23:26> having the same logic level combination as the twenty-third to twenty-sixth ECS information ECS_INF<23:26>. The third counter 263 may sequentially up-count the twenty-third to twenty-sixth ECS addresses ECS_ADD<23:26> having the same logic level combination as the twenty-third to twenty-sixth ECS information ECS_INF<23:26> whenever a level of the twenty-second ECS address ECS_ADD<22> transitions from a logic high level to a logic low level after the boot-up command BOOT is received. The twenty-third to twenty-sixth ECS addresses ECS_ADD<23:26> may be set as bits for selecting the first to fourth banks 231 to 234 illustrated in FIG. 4.

The first to twenty-sixth ECS addresses ECS_ADD<1:26> illustrated in FIG. 6 have been implemented as 26 bits, but may be implemented as various bits depending on a structure of the core circuit 23.

Figure 7:
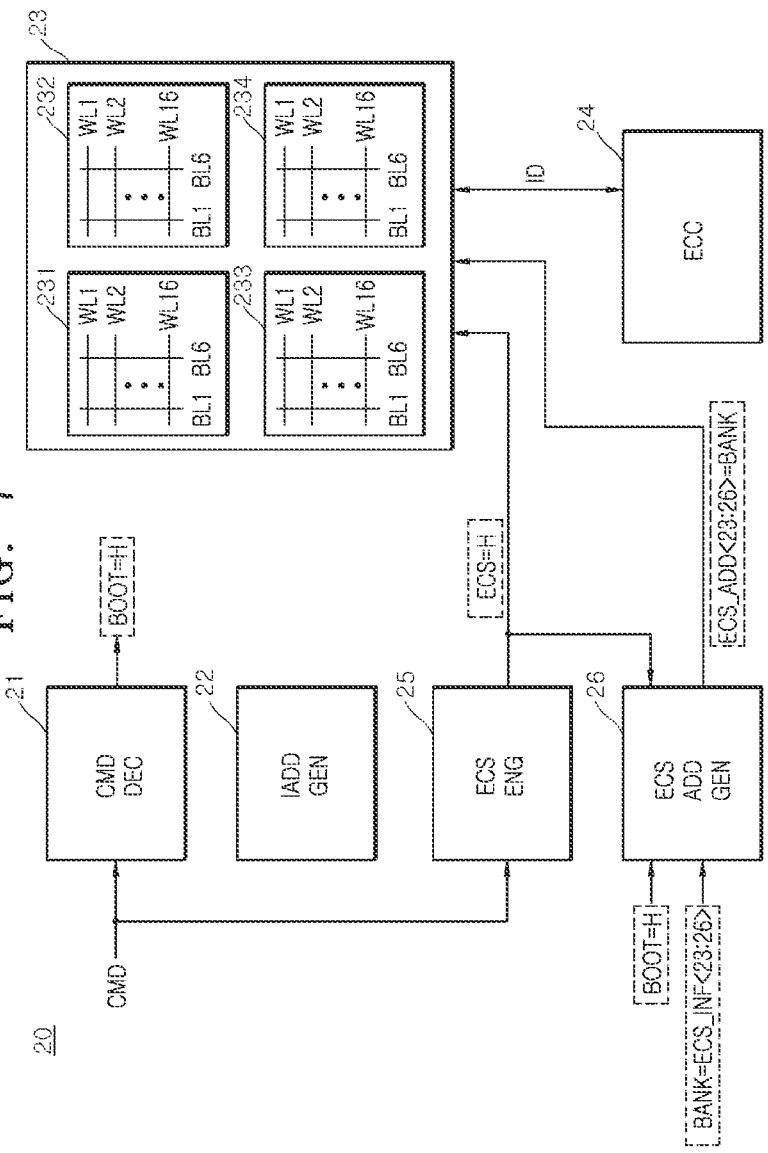
FIGS. 7 to 9 are diagrams for describing an ECS operation in some embodiments of the present disclosure.

With reference to FIG. 7, an ECS operation of the present disclosure is described, but an operation of receiving, from the controller 10, the twenty-third to twenty-sixth ECS information ECS_INF<23:26> for selecting any one bank BANK, among the first to fourth banks 231 to 234, and performing an ECS operation is described as follows. The twenty-third to twenty-sixth ECS information ECS_INF<23:26> may be set as a bank address for selecting the bank BANK.

The controller 10 may output, to the memory apparatus 20, the command CMD for performing a boot-up operation. The controller 10 may output the twenty-third to twenty-sixth ECS information ECS_INF<23:26> to the memory apparatus 20.

The command decoder 21 may generate the boot-up command BOOT having a logic high level H and for performing a boot-up operation by decoding the command CMD.

The ECS address generation circuit 26 may receive the twenty-third to twenty-sixth ECS information ECS_INF<23:26> when receiving the boot-up command BOOT having the logic high level H. When receiving the boot-up command BOOT having the logic high level H, the ECS address generation circuit 26 may generate the twenty-third to twenty-sixth ECS addresses ECS_ADD<23:26> having the same logic level combination as the twenty-third to twenty-sixth ECS information ECS_INF<23:26>.

The ECS engine 25 may generate the ECS control signal ECS having a logic high level H when receiving the command CMD having a logic level combination for performing an ECS operation during a normal operation.

When receiving the ECS control signal ECS having the logic high level H, the ECS address generation circuit 26 may generate the twenty-third to twenty-sixth ECS addresses ECS_ADD<23:26> that are sequentially up-counted from the twenty-third to twenty-sixth ECS addresses ECS_ADD<23:26> having the same logic level combination as the twenty-third to twenty-sixth ECS information ECS_INF<23:26>. The ECS address generation circuit 26 may sequentially up-count the first to twenty-second ECS addresses ECS_ADD<1:22> when receiving the ECS control signal ECS having the logic high level H. In this case, the first to twenty-second ECS addresses ECS_ADD<1:22> that are sequentially up-counted may be sequentially up-counted from the first row address for selecting the first word line of a bank that is selected by the twenty-third to twenty-sixth ECS addresses ECS_ADD<23:26>.

The core circuit 23 may output internal data ID stored in a bank, among the first to fourth banks 231 to 234, selected by the twenty-third to twenty-sixth ECS addresses ECS_ADD<23:26>.

The error correction circuit 24 may correct an error that is included in the internal data ID output by the core circuit 23 after the start of an ECS operation, and outputs, to the core circuit 23, the internal data ID having the error that is corrected.

The core circuit 23 may store the internal data ID having the error that is corrected in a bank, among the first to fourth banks 231 to 234, selected by the twenty-third to twenty-sixth ECS addresses ECS_ADD<23:26>.

That is, the core circuit 23 can prevent the omission of an ECS operation by sequentially performing ECS operations from a bank that is selected by the twenty-third to twenty-sixth ECS addresses ECS_ADD<23:26>.

Such a semiconductor system 1, according to an embodiment of the present disclosure, can prevent an ECS operation from being repeated only at a specific address or being omitted at some addresses, in a way to perform an ECS operation from a location at which an ECS operation has been previously performed, by storing, in a non-volatile apparatus that is included in the controller 10, a location of the memory apparatus 20 at which an ECS operation has been performed before a power-off operation and providing the memory apparatus 20 with the stored location at which the ECS operation has been performed after the start of a boot-up operation. Furthermore, the semiconductor system 1 can secure the reliability of data that is stored in the core circuit 23 by performing an ECS operation from a location of the memory apparatus 20 at which an ECS operation has been previously performed after the start of an ECS operation.

Figure 8:
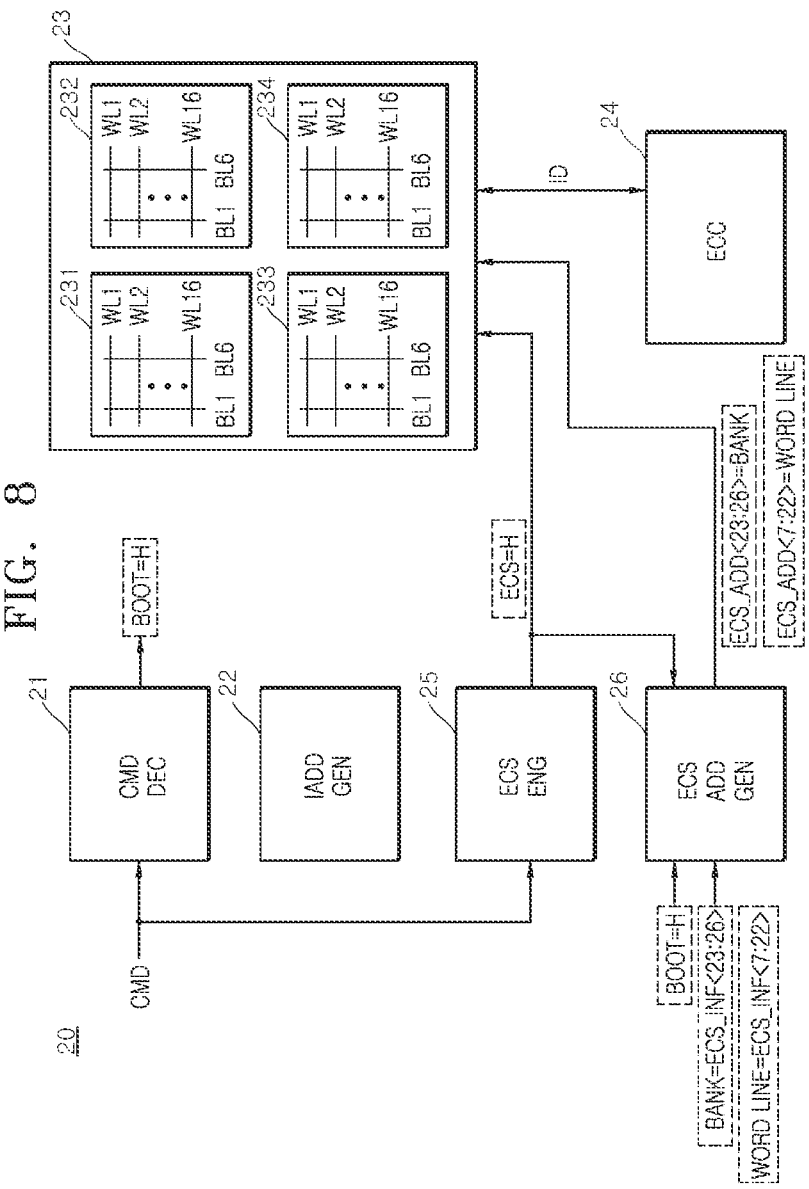

With reference to FIG. 8, an ECS operation of the present disclosure is described, but an operation of receiving, from the controller 10, the twenty-third to twenty-sixth ECS information ECS_INF<23:26> for selecting any one bank BANK of the first to fourth banks 231 to 234, receiving the seventh to twenty-second ECS information ECS_INF<7:22> for selecting any one word line WORD LINE of the first to sixteenth word lines WL1 to WL16, and performing an ECS operation is described as follows. The twenty-third to twenty-sixth ECS information ECS_INF<23:26> may be set as a bank address for selecting the bank BANK. The seventh to twenty-second ECS information ECS_INF<7:22> may be set as a row address for selecting the word line WL.

The controller 10 may output, to the memory apparatus 20, the command CMD for performing a boot-up operation. The controller 10 may output the twenty-third to twenty-sixth ECS information ECS_INF<23:26> and the seventh to twenty-second ECS information ECS_INF<7:22> to the memory apparatus 20.

The command decoder 21 may generate the boot-up command BOOT having a logic high level H and for performing a boot-up operation by decoding the command CMD.

The ECS address generation circuit 26 may receive the twenty-third to twenty-sixth ECS information ECS_INF<23:26> when receiving the boot-up command BOOT having the logic high level H. The ECS address generation circuit 26 may receive the seventh to twenty-second ECS information ECS_INF<7:22> when receiving the boot-up command BOOT having the logic high level H.

When receiving the boot-up command BOOT having the logic high level H, the ECS address generation circuit 26 may generate the twenty-third to twenty-sixth ECS addresses ECS_ADD<23:26> having the same logic level combination as the twenty-third to twenty-sixth ECS information ECS_INF<23:26>. When receiving the boot-up command BOOT having the logic high level H, the ECS address generation circuit 26 may generate the seventh to twenty-second ECS addresses ECS_ADD<7:22> having the same logic level combination as the seventh to twenty-second ECS information ECS_INF<7:22>. The ECS address generation circuit 26 may sequentially up-count the first to sixth ECS addresses ECS_ADD<1:6> when receiving the ECS control signal ECS having a logic high level H. In this case, the first to sixth ECS addresses ECS_ADD<1:6> that are sequentially up-counted may be sequentially up-counted from the first column address for selecting the first bit line of a word line of a bank that is selected by the twenty-third to twenty-sixth ECS addresses ECS_ADD<23:26> and the seventh to twenty-second ECS addresses ECS_ADD<7:22>.

The ECS engine 25 may generate the ECS control signal ECS having the logic high level H when receiving the command CMD having a logic level combination for performing an ECS operation during a normal operation.

When receiving the ECS control signal ECS having the logic high level H, the ECS address generation circuit 26 may generate the twenty-third to twenty-sixth ECS addresses ECS_ADD<23:26> sequentially up-counted from the twenty-third to twenty-sixth ECS addresses ECS_ADD<23:26> having the same logic level combination as the twenty-third to twenty-sixth ECS information ECS_INF<23:26>. When receiving the ECS control signal ECS having the logic high level H, the ECS address generation circuit 26 may generate the seventh to twenty-second ECS addresses ECS_ADD<7:22> that are sequentially up-counted from the seventh to twenty-second ECS addresses ECS_ADD<7:22> having the same logic level combination as the seventh to twenty-second ECS information ECS_INF<7:22>.

The core circuit 23 may output internal data ID that is stored in a word line that is included in a bank, among the first to fourth banks 231 to 234, selected by the twenty-third to twenty-sixth ECS addresses ECS_ADD<23:26> and the seventh to twenty-second ECS addresses ECS_ADD<7:22>.

The error correction circuit 24 may correct an error that is included in the internal data ID output by the core circuit 23 after the start of an ECS operation, and outputs, to the core circuit 23, the internal data ID having the error that is corrected.

The core circuit 23 may store the internal data ID having the error that is corrected in a word line that is included in a bank, among the first to fourth banks 231 to 234, selected by the twenty-third to twenty-sixth ECS addresses ECS_ADD<23:26>.

That is, the core circuit 23 can prevent the omission of an ECS operation by sequentially performing ECS operations from a word line included in a bank that is selected by the twenty-third to twenty-sixth ECS addresses ECS_ADD<23:26> and the seventh to twenty-second ECS addresses ECS_ADD<7:22>.

Such a semiconductor system 1 in some embodiments of the present disclosure can prevent an ECS operation from being repeated only at a specific address or being omitted at some addresses, in a way to perform an ECS operation from a location of the memory apparatus 20 at which an ECS operation has been previously performed by storing, in a non-volatile apparatus that is included in the controller 10, a location of the memory apparatus 20 at which an ECS operation has been performed before a power-off operation and providing the memory apparatus 20 with a location of the memory apparatus 20 at which an ECS operation has been performed and which has been stored after the start of a boot-up operation. Furthermore, the semiconductor system 1 can secure the reliability of data that is stored in the core circuit 23 by performing an ECS operation from a location of the memory apparatus 20 at which an ECS operation has been previously performed after the start of an ECS operation.

Figure 9:
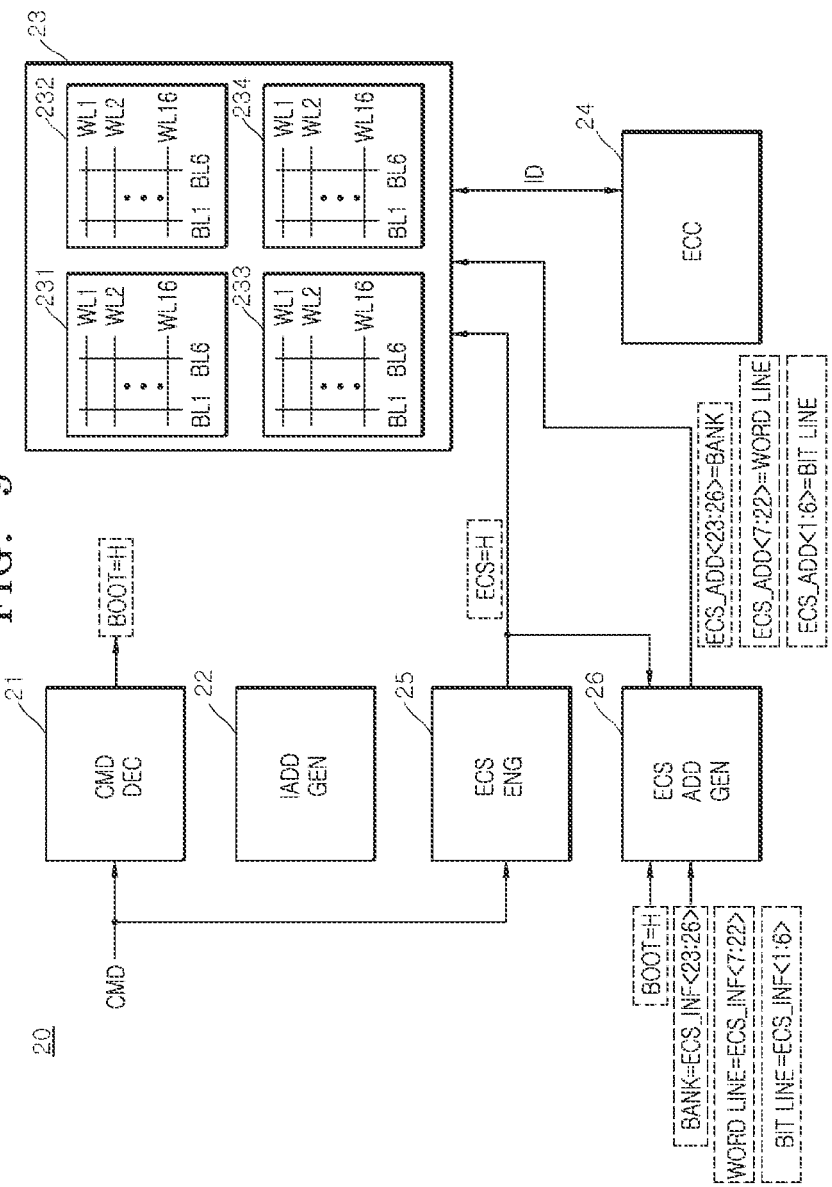

With reference to FIG. 9, an ECS operation of the present disclosure is described, but an operation of receiving, from the controller 10, the twenty-third to twenty-sixth ECS information ECS_INF<23:26> for selecting any one bank BANK of the first to fourth banks 231 to 234, the seventh to twenty-second ECS information ECS_INF<7:22> for selecting any one word line WORD LINE of the first to sixteenth word lines WL1 to WL16, and the first to sixth ECS information ECS_INF<1:6> for selecting any one bit line BIT LINE of the first to sixth bit lines BL1 to BL6 and performing an ECS operation is described as follows. The twenty-third to twenty-sixth ECS information ECS_INF<23:26> may be set as a bank address for selecting the bank BANK. The seventh o twenty-second ECS information ECS_INF<7:22> may be set as a row address for selecting the word line WL. The first to sixth ECS information ECS_INF<1:6> may be set as a column address for selecting the bit line BIT LINE.

The controller 10 may output, to the memory apparatus 20, the command CMD for performing a boot-up operation. The controller 10 may output the twenty-third to twenty-sixth ECS information ECS_INF<23:26>, the seventh to twenty-second ECS information ECS_INF<7:22>, and the first to sixth ECS information ECS_INF<1:6> to the memory apparatus 20.

The command decoder 21 may generate the boot-up command BOOT having a logic high level H and for performing a boot-up operation by decoding the command CMD.

The ECS address generation circuit 26 may receive the twenty-third to twenty-sixth ECS information ECS_INF<23:26> when receiving the boot-up command BOOT having the logic high level H. The ECS address generation circuit 26 may receive the seventh to twenty-second ECS information ECS_INF<7:22> when receiving the boot-up command BOOT having the logic high level H. The ECS address generation circuit 26 may receive the first to sixth ECS information ECS_INF<1:6> when receiving the boot-up command BOOT having the logic high level H. When receiving the boot-up command BOOT having the logic high level H, the ECS address generation circuit 26 may generate the twenty-third to twenty-sixth ECS addresses ECS_ADD<23:26> having the same logic level combination as the twenty-third to twenty-sixth ECS information ECS_INF<23:26>. When receiving the boot-up command BOOT having the logic high level H, the ECS address generation circuit 26 may generate the seventh to twenty-second ECS addresses ECS_ADD<7:22> having the same logic level combination as the seventh to twenty-second ECS information ECS_INF<7:22>. When receiving the boot-up command BOOT having the logic high level H, the ECS address generation circuit 26 may generate the first to sixth ECS addresses ECS_ADD<1:6> having the same logic level combination as the first to sixth ECS information ECS_INF<1:6>. When the ECS control signal ECS having a logic high level H is input to the ECS address generation circuit 26, the first to sixth ECS addresses ECS_ADD<1:6> may be sequentially up-counted from a column address included in a bank that is selected by the first to twenty-sixth ECS addresses ECS_ADD<1:26> and used for selecting a bit line connected to a selected word line.

The ECS engine 25 may generate the ECS control signal ECS having a logic high level H when receiving the command CMD having a logic level combination for performing an ECS operation during a normal operation.

When receiving the ECS control signal ECS having the logic high level H, the ECS address generation circuit 26 may generate the twenty-third to twenty-sixth ECS addresses ECS_ADD<23:26> sequentially up-counted from the twenty-third to twenty-sixth ECS addresses ECS_ADD<23:26> having the same logic level combination as the twenty-third to twenty-sixth ECS information ECS_INF<23:26>. When receiving the ECS control signal ECS having the logic high level H, the ECS address generation circuit 26 may generate the seventh to twenty-second ECS addresses ECS_ADD<7:22> sequentially up-counted from the seventh to twenty-second ECS addresses ECS_ADD<7:22> having the same logic level combination as the seventh to twenty-second ECS information ECS_INF<7:22>. When receiving the ECS control signal ECS having the logic high level H, the ECS address generation circuit 26 may generate the first to sixth ECS addresses ECS_ADD<1:6> that are sequentially up-counted from the first to sixth ECS addresses ECS_ADD<1:6> having the same logic level combination as the first to sixth ECS information ECS_INF<1:6>.

The core circuit 23 may output internal data ID that is stored in a bit line that is included in a bank, among the first to fourth banks 231 to 234, selected by the twenty-third to twenty-sixth ECS addresses ECS_ADD<23:26>, the seventh to twenty-second ECS addresses ECS_ADD<7:22>, and the first to sixth ECS addresses ECS_ADD<1:6>.

The error correction circuit 24 may correct an error that is included in the internal data ID output by the core circuit 23 after the start of an ECS operation, and outputs, to the core circuit 23, the internal data ID having the error that is corrected.

The core circuit 23 may store the internal data ID having the error that is corrected in a bit line included in a bank, among the first to fourth banks 231 to 234, selected by the twenty-third to twenty-sixth ECS addresses ECS_ADD<23:26>.

That is, the core circuit 23 can prevent the omission of an ECS operation by sequentially performing ECS operations from a bit line included in a bank that is selected by the twenty-third to twenty-sixth ECS addresses ECS_ADD<23:26>, the seventh to twenty-second ECS addresses ECS_ADD<7:22>, and the first to sixth ECS addresses ECS_ADD<1:6>.

Such a semiconductor system 1 in some embodiments of the present disclosure can prevent an ECS operation from being repeated only at a specific address or being omitted at some addresses, in a way to perform an ECS operation from a location of the memory apparatus 20 at which an ECS operation has been previously performed by storing, in a non-volatile apparatus that is included in the controller 10, a location of the memory apparatus 20 at which an ECS operation has been performed before a power-off operation and providing the memory apparatus 20 with a location of the memory apparatus 20 at which an ECS operation has been performed and which has been stored after the start of a boot-up operation. Furthermore, the semiconductor system 1 can secure the reliability of data that is stored in the core circuit 23 by performing an ECS operation from a location of the memory apparatus 20 at which an ECS operation has been previously performed after the start of an ECS operation.

Figure 10:
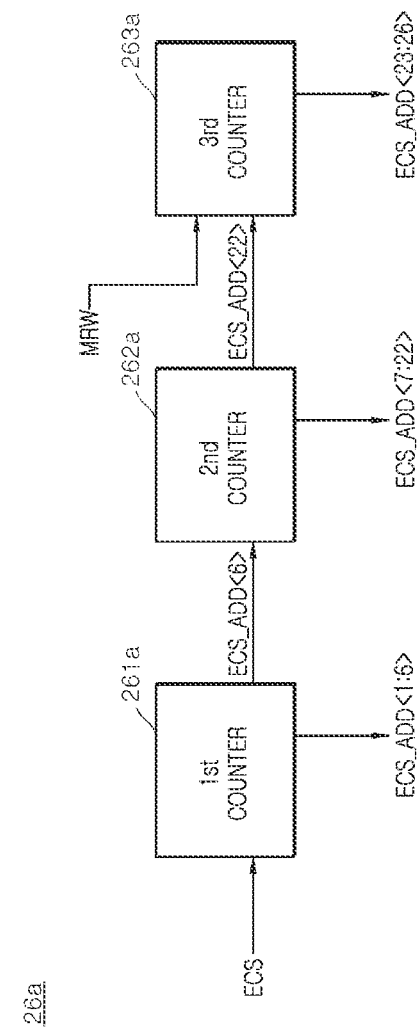
FIG. 10 is a block diagram illustrating a configuration of an ECS address generation circuit according to another embodiment of the ECS address generation circuit included in the semiconductor apparatus in some embodiments of the present disclosure, which is illustrated in FIG. 3.

FIG. 10 is a block diagram illustrating a configuration of an ECS address generation circuit 26a according to another embodiment of the ECS address generation circuit 26 included in the memory apparatus 20.

An ECS address generation circuit 26a may include a first counter 261a, a second counter 262a and a third counter 263a.

The first counter 261a may receive an ECS control signal ECS and may generate first to sixth ECS addresses ECS_ADD<1:6> that are sequentially up-counted. The first counter 261a may generate the first to sixth ECS addresses ECS_ADD<1:6> that are up-counted whenever the ECS control signal ECS is received. The first counter 261a may generate the first to sixth ECS addresses ECS_ADD<1:6> that are up-counted whenever a level of the ECS control signal ECS transitions from a logic high level to a logic low level.

The second counter 262a may receive a sixth ECS address ECS_ADD<6> and may generate seventh to twenty-second ECS addresses ECS_ADD<7:22> that are sequentially up-counted. The second counter 262a may generate the seventh to twenty-second ECS addresses ECS_ADD<7:22> up-counted whenever the sixth ECS address ECS_ADD<6> is received. The second counter 262a may generate the seventh to twenty-second ECS addresses ECS_ADD<7:22> up-counted whenever a level of the sixth ECS address ECS_ADD<6> transitions from a logic high level to a logic low level.

The third counter 263a may receive a twenty-second ECS address ECS_ADD<22> and may generate twenty-third to twenty-sixth ECS addresses ECS_ADD<23:26> that are sequentially up-counted. The third counter 263a may generate the twenty-third to twenty-sixth ECS addresses ECS_ADD<23:26> that are up-counted whenever the twenty-second ECS address ECS_ADD<22> is received. The third counter 263a may generate the twenty-third to twenty-sixth ECS addresses ECS_ADD<23:26> that are up-counted whenever a level of the twenty-second ECS address ECS_ADD<22> transitions from a logic high level to a logic low level. The third counter 263a may generate the twenty-third to twenty-sixth ECS addresses ECS_ADD<23:26> that are selectively counted based on the number of mode register write commands MRW input to the third counter 263a. The third counter 263a may generate the twenty-third ECS address ECS_ADD<23> that are counted when the mode register write command MRW is received once. The third counter 263a may generate the twenty-fourth ECS address ECS_ADD<24> that is counted when the mode register write command MRW is received twice. The third counter 263a may generate the twenty-fifth ECS address ECS_ADD<25> that is counted when the mode register write command MRW is received three times. The third counter 263a may generate the twenty-sixth ECS address ECS_ADD<26> that is counted when the mode register write command MRW is received four times. The twenty-third to twenty-sixth ECS addresses ECS_ADD<23:26> that are counted based on the number of mode register write commands MRW input to the third counter 263a may be variously set according to embodiments.

The first to twenty-sixth ECS addresses ECS_ADD<1:26>, illustrated in FIG. 10, has been implemented as 26 bits, but may be implemented various bits depending on a structure of the core circuit 23.

Figure 11:
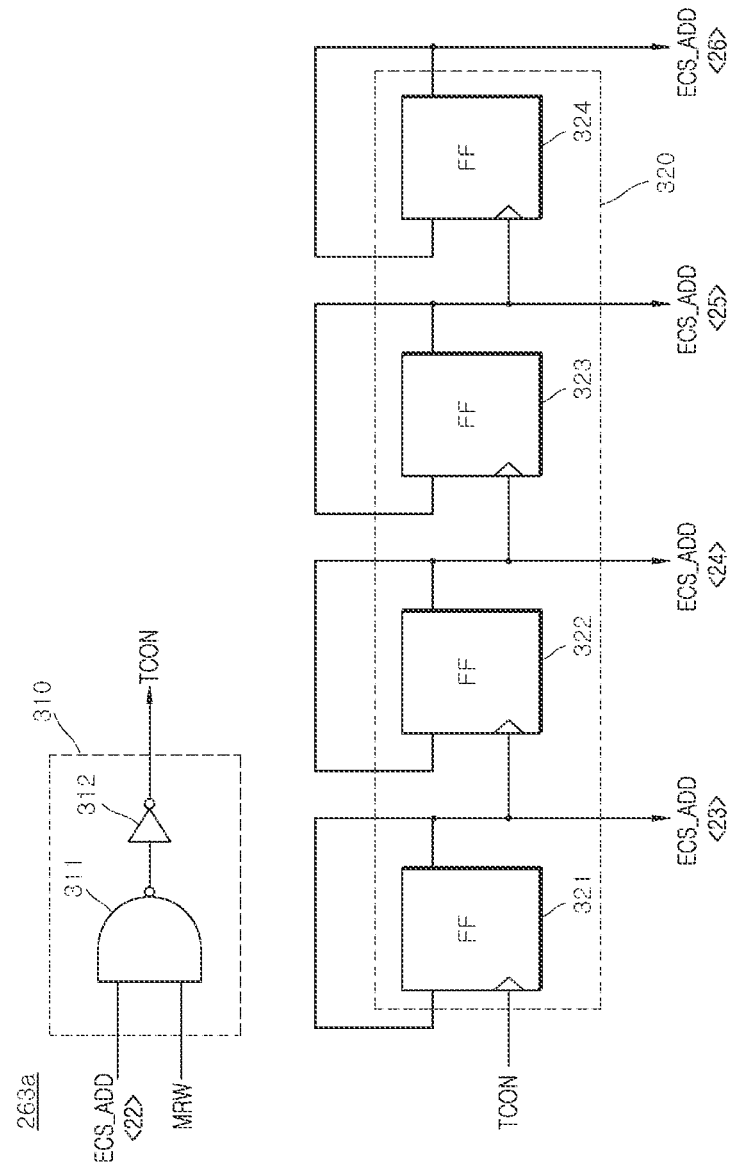
FIG. 11 is a diagram illustrating a configuration of a third counter according to another embodiment of the present disclosure, which is included in the ECS address generation circuit illustrated in FIG. 10.

FIG. 11 is a block diagram illustrating a configuration of the third counter 263a, according an embodiment, which is included in the ECS address generation circuit 26a. The third counter 263a may include a transfer control signal generation circuit 310 and a shifting circuit 320.

The transfer control signal generation circuit 310 may be implemented by using a NAND gate 311 and an inverter 312.

The transfer control signal generation circuit 310 may generate a transfer control signal TCON based on the twenty-second ECS address ECS_ADD<22> and the mode register write command MRW. The transfer control signal generation circuit 310 may generate the transfer control signal TCON having a logic low level whenever a level of the twenty-second ECS address ECS_ADD<22> transitions from a logic high level to a logic low level. The transfer control signal generation circuit 310 may generate the transfer control signal TCON having a logic low level whenever a level of the mode register write command MRW transitions from a logic high level to a logic low level.

The shifting circuit 320 may include a first flip-flop (FF) 321, a second flip-flop 322, a third flip-flop 323, and a fourth flip-flop 324.

The first flip-flop 321 nay generate the twenty-third ECS address ECS_ADD<23> having a logic high level by inverting and buffering the twenty-third ECS address ECS_ADD<23> having a logic low level when the transfer control signal TCON is received in a logic low level. The first flip-flop 321 may generate the twenty-third ECS address ECS_ADD<23> having a logic low level by inverting and buffering the twenty-third ECS address ECS_ADD<23> having a logic high level when the transfer control signal TCON is received in a logic low level.

The second flip-flop 322 may generate the twenty-fourth ECS address ECS_ADD<24> having a logic high level by inverting and buffering the twenty-fourth ECS address ECS_ADD<24> having a logic low level when the twenty-third ECS address ECS_ADD<23> is received in a logic low level. The second flip-flop 322 may generate the twenty-fourth ECS address ECS_ADD<24> having a logic low level by inverting and buffering the twenty-fourth ECS address ECS_ADD<24> having a logic high level when the twenty-third ECS address ECS_ADD<23> is received in a logic low level.

The third flip-flop 323 may generate the twenty-fifth ECS address ECS_ADD<25> having a logic high level by inverting and buffering the twenty-fifth ECS address ECS_ADD<25> having a logic low level when the twenty-fourth ECS address ECS_ADD<24> is received in a logic low level. The third flip-flop 323 may generate the twenty-fifth ECS address ECS_ADD<25> having a logic low level by inverting and buffering the twenty-fifth ECS address ECS_ADD<25> having a logic high level when the twenty-fourth ECS address ECS_ADD<24> is received in a logic low level.

The fourth flip-flop 324 may generate the twenty-sixth ECS address ECS_ADD<26> having a logic high level by inverting and buffering the twenty-sixth ECS address ECS_ADD<26> having a logic low level when the twenty-fifth ECS address ECS_ADD<25> is received in a logic low level. The fourth flip-flop 324 may generate the twenty-sixth ECS address ECS_ADD<26> having a logic low level by inverting and buffering the twenty-sixth ECS address ECS_ADD<26> having a logic high level when the twenty-fifth ECS address ECS_ADD<25> received in a logic low level.

The third counter 263a may generate the twenty-third to twenty-sixth ECS addresses ECS_ADD<23:26> sequentially up-counted when a level of the twenty-second ECS address ECS_ADD<22> transitions from a logic high level to a logic low level. The third counter 263a may generate the twenty-third to twenty-sixth ECS addresses ECS_ADD<23:26> that are selectively counted based on the number of mode register write commands MRW input to the third counter 263a. For example, when receiving the mode register write command MRW to the third counter 263a once, the twenty-third ECS address ECS_ADD<23> of the twenty-third to twenty-sixth ECS addresses ECS_ADD<23:26> may be counted. When the mode register read command MRR is input to the third counter 263a three times, the twenty-fifth ECS address ECS_ADD<25> of the twenty-third to twenty-sixth ECS addresses ECS_ADD<23:26> may be counted.

Figure 12:
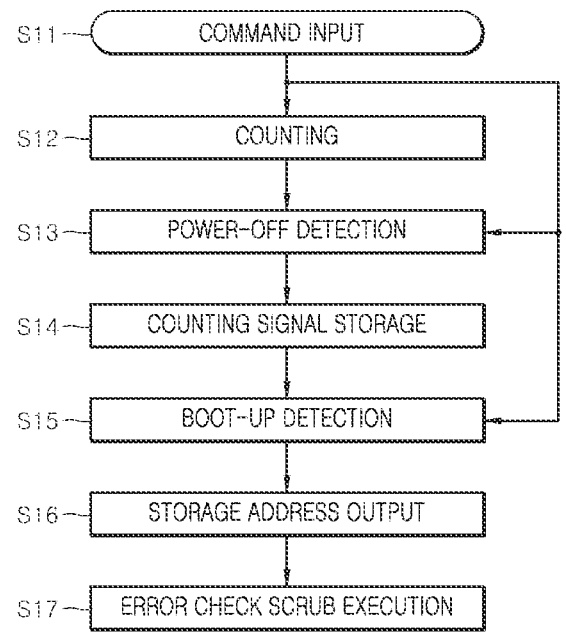
FIG. 12 is a flowchart for describing an ECS operation method in some embodiments of the present disclosure.

FIG. 12 is a flowchart for describing an ECS operation method in some embodiments of the present disclosure. The ECS operation method may include a command input step S11, a counting step S12, a power-off detection step S13, a counting signal storage step S14, a boot-up detection step S15, a storage address output step S16 and an ECS operation execution step S17.

The command input step S11 may be configured as a step of generating, by the command generation circuit 11 of the controller 10, the command CMD for performing an ECS operation of the memory apparatus 20. In the command input step S11, the command generation circuit 11 of the controller 10 may output the command CMD for performing the ECS operation to the memory apparatus 20. In the command input step S11, the ECS engine 25 of the memory apparatus 20 may generate the ECS control signal ECS by decoding the command CMD.

The counting step S12 may be configured as a step of counting, by the controller 10, the number of ECS operations. In the counting step S12, the ECS command counter 13 of the controller 10 may generate the first to M-th counting signals CNT<1:M> that are counted by the number of ECS operations based on the command CMD.

The power-off detection step S13 may be configured as a step of generating, by the command generation circuit 11 of the controller 10, the command CMD for performing a power-off operation of the memory apparatus 20. In the power-off detection step S13, the ECS command counter 13 of the controller 10 may generate the power-off control signal PWO after the start of a power-off operation based on the command CMD.

The counting signal storage step S14 may be configured as a step of storing the first to M-th counting signals CNT<1:M> before a power-off operation in the storage circuit 14, that is, a non-volatile apparatus. In the counting signal storage step S14, the storage circuit 14 of the controller 10 may store the first to M-th counting signals CNT<1:M> when receiving the power-off control signal PWO.

The boot-up detection step S15 may be configured as a step of generating, by the command generation circuit 11 of the controller 10, the command CMD for performing a boot-up operation of the memory apparatus 20. In the boot-up detection step S15, the ECS command counter 13 of the controller 10 may generate the boot-up control signal BTC after the start of a boot-up operation based on the command CMD. In the boot-up detection step S15, the command decoder 21 of the memory apparatus 20 may generate the boot-up command BOOT for performing a boot-up operation by decoding the command CMD.

The storage address output step S16 may be configured as a step of outputting, as the first to M-th storage addresses SADD<1:M>, the first to M-th counting signals CNT<1:M> that are stored after the start of a boot-up operation. In the storage address output step S16, the storage circuit 14 of the controller 10 may output, as the first to M-th storage addresses SADD<1:M>, the first to M-th counting signals CNT<1:M> that are stored when the boot-up control signal BTC is received. In the storage address output step S16, the ECS command counter 13 of the controller 10 may output the first to M-th storage addresses SADD<1:M> as the first to M-th ECS information ECS_INF<1:M> after the start of the boot-up operation. In the storage address output step S16, the ECS address generation circuit 26 of the memory apparatus 20 may receive the first to M-th ECS information ECS_INF<1:M> when receiving the boot-up command BOOT.

The ECS operation execution step S17 may be configured as a step of performing an ECS operation from a location of the memory apparatus 20 at which an ECS operation has been previously performed based on the first to M-th ECS information ECS_INF<1:M>. In the ECS operation execution step S17, the command generation circuit 11 may generate the command CMD for performing an ECS operation of the memory apparatus 20. In the ECS operation execution step S17, the ECS engine 25 of the memory apparatus 20 may generate the ECS control signal ECS by decoding the command CMD. In the ECS operation execution step S17, when receiving the ECS control signal ECS, the ECS address generation circuit 26 of the memory apparatus 20 may generate the first to M-th ECS addresses ECS_ADD<1:M> sequentially up-counted from the first to M-th ECS addresses ECS_ADD<1:M> having the same logic level combination as the first to M-th ECS information ECS_INF<1:M> that is received after the start of a boot-up operation. In the ECS operation execution step S17, when receiving the ECS control signal ECS, the core circuit 23 may store internal data ID, the error of which has been corrected after outputting internal data ID stored at a location selected by the first to M-th ECS addresses ECS_ADD<1:M>.

Such an ECS operation method of the present disclosure can prevent an ECS operation from being repeated only at a specific address or omitted at some addresses, in a way to perform an ECS operation from a location of the memory apparatus 20 at which an ECS operation has been previously performed by storing, in a non-volatile apparatus, a location of the memory apparatus 20 at which an ECS operation has been performed before a power-off operation and providing the memory apparatus with a location of the memory apparatus 20 at which an ECS operation has been performed and which has been stored after the start of a boot-up operation. Furthermore, the ECS operation method can secure the reliability of data that is stored in the core circuit by performing an ECS operation from a location of the memory apparatus 20 at which an ECS operation has been previously performed after the start of an ECS operation.

Figure 13:
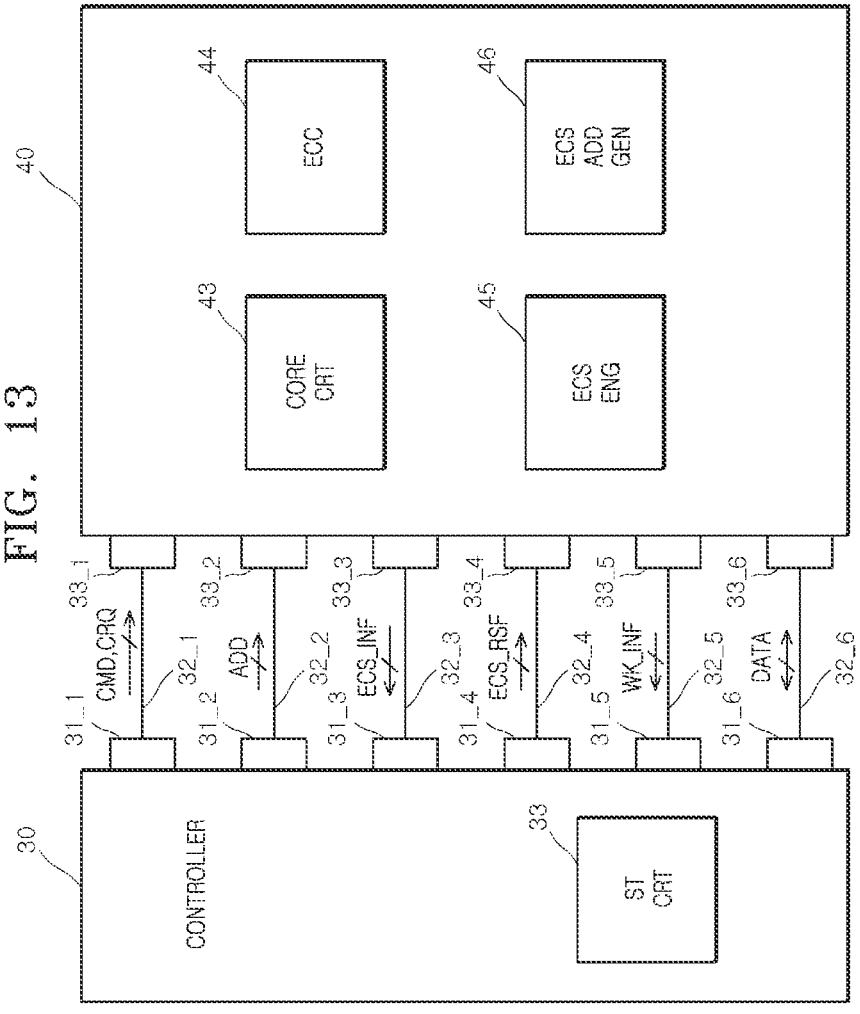
FIG. 13 is a block diagram illustrating a configuration of a semiconductor system according to another embodiment of the present disclosure.

As illustrated in FIG. 13, a semiconductor system 2 according to another embodiment of the present disclosure may include a controller 30 and a memory apparatus 40.

The controller 30 may include a first control pin 31_1, a second control pin 31_2, a third control pin 31_3, a fourth control pin 31_4, a fifth control pin 31_5, and a sixth control pin 31_6. The memory apparatus 40 may include a first device pin 33_1, a second device pin 33_2, a third device pin 33_3, a fourth device pin 33_4, a fifth device pin 33_5, and a sixth device pin 33_6.

The controller 30 may transmit a command CMD and a count request signal CRQ to the memory apparatus 40 through a first transmission line 32_1 that is coupled between the first control pin 31_1 and the first device pin 33_1. Each of the first control pin 31_1, the first transmission line 32_1, and the first device pin 33_1 may be implemented in plural based on the number of bits of the command CMD and the count request signal CRQ. The command CMD and the count request signal CRQ may be transmitted through different transmission lines. The controller 30 may transmit the address ADD to the memory apparatus 40 through a second transmission line 32_2 that is coupled between the second control pin 31_2 and the second device pin 33_2. Each of the second control pin 31_2, the second transmission line 32_2, and the second device pin 33_2 may be implemented in plural based on the number of bits of the address ADD. The controller 30 may receive ECS information ECS_INF from the memory apparatus 40 through a third transmission line 32_3 that is coupled between the third control pin 31_3 and the third device pin 33_3. Each of the third control pin 31_3, the third transmission line 32_3, and the third device pin 33_3 may be implemented in plural based on the number of bits of the ECS information ECS_INF. The controller 30 may transmit an ECS resume information ECS_RSF to the memory apparatus 40 through a fourth transmission line 32_4 that is coupled between the fourth control pin 31_4 and the fourth device pin 33_4. Each of the fourth control pin 31_4, the fourth transmission line 32_4, and the fourth device pin 33_4 may be implemented in plural based on the number of bits of the ECS resume information ECS_RSF. The controller 30 may receive weak cell information WK_INF from the memory apparatus 40 through a fifth transmission line 32_5 that is coupled between the fifth control pin 31_5 and the fifth device pin 33_5. Each of the fifth control pin 31_5, the fifth transmission line 32_5, and the fifth device pin 33_5 may be implemented in plural based on the number of bits of the weak cell information WK_INF. The controller 30 may output data DATA to the memory apparatus 40 or receive data DATA from the memory apparatus 40 through a sixth transmission line 32_6 that is coupled between the sixth control pin 31_6 and the sixth device pin 33_6. Each of the sixth control pin 31_6, the sixth transmission line 32_6, and the sixth device pin 33_6 may be implemented in plural based on the number of bits of the data DATA.

The ECS information ECS_INF has been implemented to be transmitted to the controller 30 through the third transmission line 32_3, but may be implemented to be transmitted to the controller 30 through the first transmission line 32_1 through which the command CMD is transmitted and the second transmission line 32_2 through which the address ADD is transmitted in some embodiments. The weak cell information WK_INF has been implemented to be transmitted to the controller 30 through the fifth transmission line 32_5, but may be implemented to be transmitted to the controller 30 through the sixth transmission line 32_6 through which the data DATA is transmitted in some embodiments.

The controller 30 may include a storage circuit (ST CRT) 33.

The storage circuit 33 may store the ECS information ECS_INF, that is, information with regard to the location at which an ECS operation has been performed after the start of a power-off operation. The storage circuit 33 may output, as an ECS storage address ECS_SADD, the ECS information ECS_INF that is stored after the start of a boot-up operation. The storage circuit 33 may be implemented as a non-volatile apparatus that maintains the ECS information ECS_INF that is stored in the non-volatile apparatus after the start of a power-off operation. The storage circuit 33 has been implemented to be included in the controller 30, but may be implemented as a non-volatile apparatus provided outside of the controller 30 in some embodiments.

The controller 30 may receive the ECS information ECS_INF, that is, information with regard to the location of the memory apparatus 40 at which an ECS operation has been performed before a power-off operation, and may store the ECS information ECS_INF. The controller 30 may output, as the ECS resume information ECS_RSF, the ECS information ECS_INF that is stored after the start of a boot-up operation.

The memory apparatus 40 may include a core circuit (CORE CRT) 43, an error correction circuit (ECC) 44, an ECS engine (ECS ENG) 45, and an ECS address generation circuit (ECS ADD GEN) 46.

The core circuit 43 may store internal data (ID in FIG. 15), the error of which has been corrected, after outputting internal data (ID in FIG. 15) stored in the core circuit 43 after the start of an ECS operation.

The error correction circuit 44 may detect an error that is included in the internal data (ID in FIG. 15) after the start of an ECS operation. The error correction circuit 44 may correct an error that is included in the internal data (ID in FIG. 15) after the start of an ECS operation.

The ECS engine 45 may control an ECS operation based on the command CMD.

The ECS address generation circuit 46 may generate ECS addresses (ECS_ADD<1:M> in FIG. 15) sequentially up-counted after the start of an ECS operation based on the command CMD. The ECS address generation circuit 46 may generate the ECS information ECS_INF from the ECS addresses (ECS_ADD<1:M> in FIG. 15) after the start of an power-off operation based on the command CMD. The ECS address generation circuit 46 may generate the ECS addresses (ECS_ADD<1:M> in FIG. 15) that are sequentially up-counted from the same ECS address (ECS_ADD<1:M> in FIG. 15) as the ECS resume information ECS_RSF after the start of a boot-up operation based on the command CMD.

The memory apparatus 40 may perform an ECS operation based on the ECS addresses (ECS_ADD<1:M> in FIG. 15) that are sequentially up-counted after the start of an ECS operation. The memory apparatus 40 may output the ECS addresses (ECS_ADD<1:M> in FIG. 15), that is, information with regard to the location of the memory apparatus 40 at which an ECS operation has been performed after the start of a power-off operation, as the ECS information ECS_INF. The memory apparatus 40 may receive the ECS resume information ECS_RSF after the start of a boot-up operation and may perform an ECS operation based on the ECS addresses (ECS_ADD<1:M> in FIG. 15) that are sequentially up-counted from the same ECS address (ECS_ADD<1:M> in FIG. 15) as the ECS resume information ECS_RSF.

Figure 14:
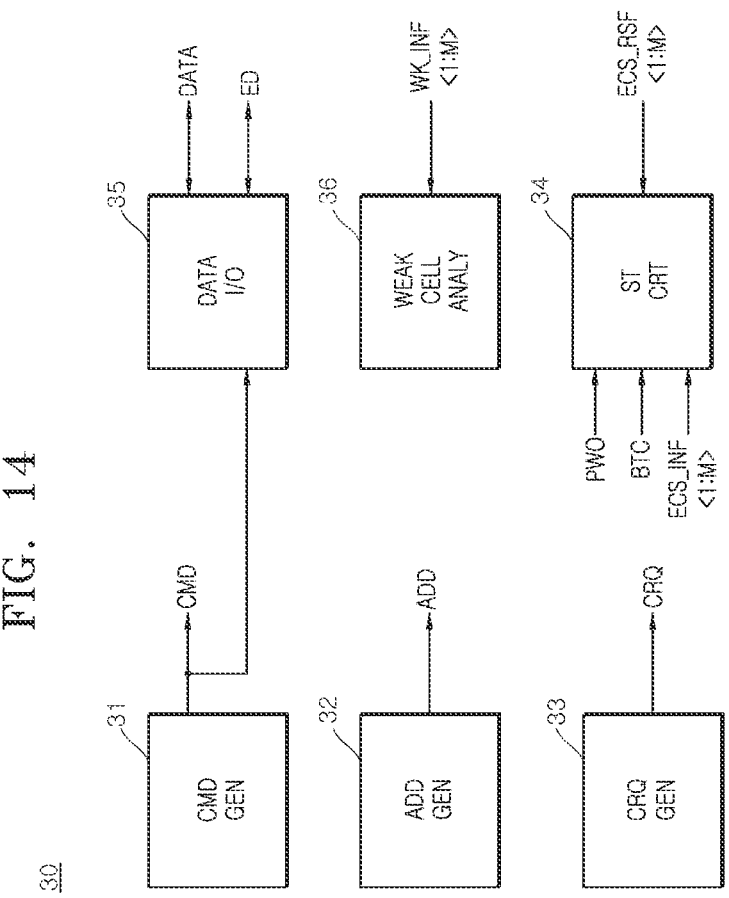
FIG. 14 is a block diagram illustrating a configuration of a controller according to another embodiment of the present disclosure, which is included in the semiconductor system illustrated in FIG. 13.

FIG. 14 is a block diagram illustrating a configuration of the controller 30 according an embodiment, which is included in the semiconductor system 2. The controller 30 may include a command generation circuit (CMD GEN) 31, an address generation circuit (ADD GEN) 32, a count request signal generation circuit (CRQ GEN) 33, a storage circuit (ST CRT) 34, a data input and output circuit (DATA I/O) 35, and a weak cell analysis circuit (WEAK CELL ANALY) 36.

The command generation circuit 31 may generate the command CMD for controlling an operation of the memory apparatus 40. The command generation circuit 41 may generate the command CMD for performing a write operation and read operation of the memory apparatus 40. The command generation circuit 31 may generate the command CMD for performing an ECS operation of the memory apparatus 40. The command generation circuit 31 may generate the command CMD for performing a power-off operation of the memory apparatus 40. The command generation circuit 31 may generate the command CMD for performing a boot-up operation of the memory apparatus 40. The command generation circuit 31 may generate the command CMD for performing a mode register read operation of the memory apparatus 40. Logic level combination of the command CMDs for performing the write operation, the read operation, the ECS operation, the power-off operation, the boot-up operation, and the mode register read operation may be set as different logic level combinations. The command CMD has been illustrated as only one signal, but may be set to include multiple bits. The write operation and the read operation may be set as a normal operation of storing, by the memory apparatus 40, data DATA and inputting and outputting stored data DATA. The ECS operation may be set as an operation of correcting, by the memory apparatus 40, an error of data DATA through an error correction code (ECC) with respect to all regions in which the data DATA has been stored and re-storing the data DATA. The power-off operation may be set as an operation of providing notification that an operation of the memory apparatus 20 is terminated by blocking power that is supplied to the memory apparatus 20. The boot-up operation may be set as an operation of outputting information that is programmed in a fuse array (not illustrated) included in the memory apparatus 20. The mode register read operation may be set as an operation of outputting operation information that is stored in a register (not illustrated) that is included in the memory apparatus 20.

The address generation circuit 32 may generate the address ADD for performing a write operation or a read operation. The address generation circuit 32 may generate the address ADD for performing a write operation and read operation of the core circuit 43 included in the memory apparatus 40. The address ADD has been illustrated as only one signal, but may be set to include multiple bits.

The count request signal generation circuit 33 may generate the count request signal CRQ before a power-off operation is performed. The count request signal generation circuit 33 may transmit the count request signal CRQ to the memory apparatus 40 before a power-off operation is performed.

The storage circuit 34 may store first to M-th ECS information ECS_INF<1:M> when receiving a power-off control signal PWO generated before a power-off operation. The storage circuit 34 may output, as first to M-th ECS storage addresses ECS_SADD<1:M>, the first to M-th ECS information ECS_INF<1:M> that is stored when a boot-up control signal BTC generated after the start of a boot-up operation is received. The storage circuit 34 may be implemented as a non-volatile apparatus that maintains the first to M-th ECS information ECS_INF<1:M> that is stored in the storage circuit 33 after the start of a power-off operation. The storage circuit 34 may be implemented to output the first to M-th ECS information ECS_INF<1:M> as the first to M-th ECS storage addresses ECS_SADD<1:M> by up-counting the first to M-th ECS information ECS_INF<1:M> once. The operation of up-counting the first to M-th ECS information ECS_INF<1:M> once is for performing an ECS operation on a next location that is not the location of the memory apparatus 40 at which an ECS operation has been previously performed.

The data input and output circuit 35 may receive external data ED from an external apparatus (e.g., HOST) after the start of a write operation based on the command CMD. The data input and output circuit 35 may generate data DATA from the external data ED after the start of a write operation based on the command CMD. The data input and output circuit 35 may output the data DATA to the memory apparatus 40 after the start of a write operation based on the command CMD. The data input and output circuit 34 may receive data DATA from the memory apparatus 40 after the start of a read operation based on the command CMD. The data input and output circuit 35 may generate external data ED from the data DATA after the start of a read operation based on the command CMD. The data input and output circuit 35 may output the external data ED to an external apparatus (e.g., HOST) after the start of a read operation based on the command CMD.

The weak cell analysis circuit 36 may receive first to M-th weak cell information WK_INF<1:M> from the memory apparatus 40. The weak cell analysis circuit 36 may manage a failure of the core circuit 43 included in the memory apparatus 40 based on the first to M-th weak cell information WK_INF<1:M>. The weak cell analysis circuit 36 may manage a location at which internal data (ID in FIG. 15), the error of which has been corrected is stored in the memory apparatus 40 based on the first to M-th weak cell information WK_INF<1:M>. The weak cell analysis circuit 36 may control a repair operation of additionally refreshing a location at which internal data (ID in FIG. 15), the error of which has been corrected is stored in the memory apparatus 40 or changing a location at which internal data (ID in FIG. 15), the error of which has been corrected is stored in the memory apparatus 40.

Figure 15:
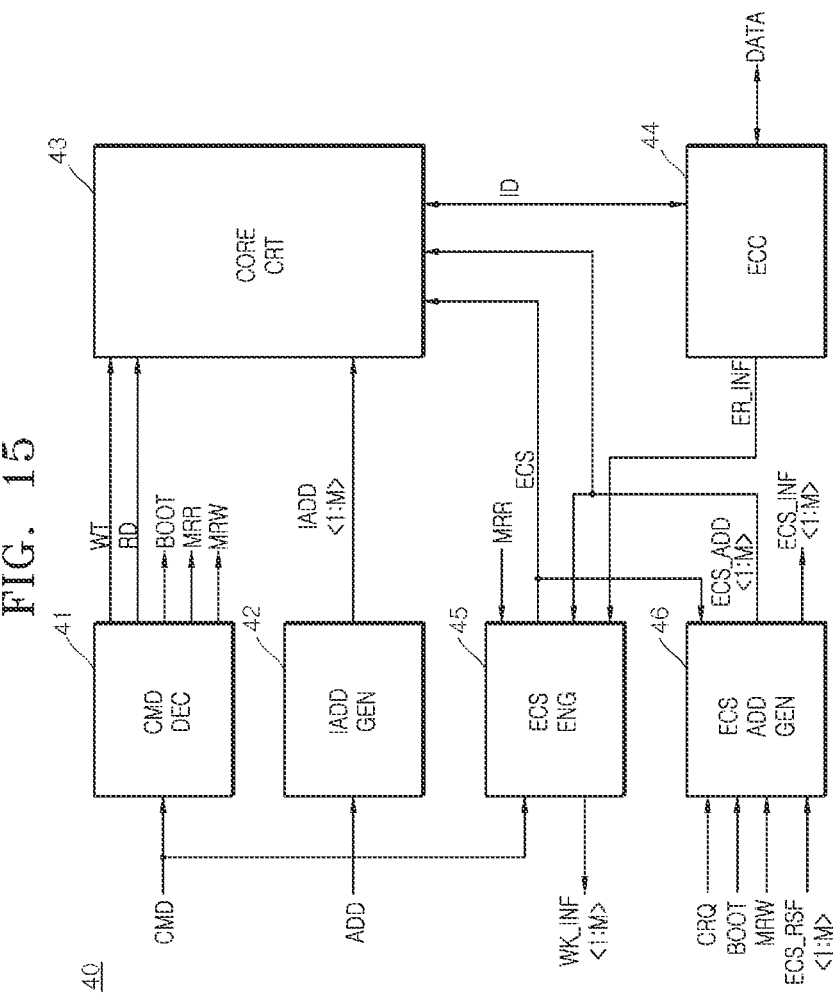
FIG. 15 is a block diagram illustrating a configuration of a semiconductor apparatus according to another embodiment of the present disclosure, which is included in the semiconductor system illustrated in FIG. 13.

FIG. 15 is a block diagram illustrating a configuration of the memory apparatus 40 according an embodiment, which is included in the semiconductor system 2. The memory apparatus 40 may include a command decoder (CMD DEC) 41, an internal address generation circuit (IADD GEN) 42, the core circuit (CORE CRT) 43, the error correction circuit (ECC) 44, the ECS engine (ECS ENG) 45, and the ECS address generation circuit (ECS ADD GEN) 46.

The command decoder 41 may generate a write command WT, a read command RD, a boot-up command BOOT, a mode register read command MRR, and a mode register write command MRW by decoding a command CMD. The command decoder 41 may generate the write command WT for performing a write operation, that is, a normal operation, by decoding the command CMD. The command decoder 41 may generate a read command RD for performing a read operation, that is, a normal operation, by decoding the command CMD. The command decoder 41 may generate the boot-up command BOOT for performing a boot-up operation by decoding the command CMD. The command decoder 41 may generate the mode register read command MRR for performing a mode register read operation by decoding the command CMD. The command decoder 41 may generate the mode register write command MRW for performing a mode register write operation by decoding the command CMD.

The internal address generation circuit 42 may generate first to M-th internal addresses IADD<1:M> by decoding an address ADD. The internal address generation circuit 42 may generate the first to M-th internal addresses IADD<1:

M> by decoding the address ADD after the start of a write operation or a read operation, that is, normal operations.

The core circuit 43 may store internal data ID at a location that is selected by the first to M-th internal addresses IADD<1:M> when receiving the write command WT. The core circuit 43 may output internal data ID that is stored at a location that is selected by the first to M-th internal addresses IADD<1:M> when receiving the read command RD. When receiving an ECS control signal ECS, the core circuit 43 may store internal data ID, the error of which has been corrected, after outputting internal data ID that is stored at a location that is selected by the first to M-th ECS addresses ECS_ADD<1:M>. The core circuit 43 may be implemented as the same configuration as the core circuit 23, illustrated in FIG. 4, and performs the same operation as the core circuit 23, and thus, a detailed description thereof is omitted.

The error correction circuit 44 may generate internal data ID by correcting an error that is included in data DATA after the start of a write operation. The error correction circuit 44 may generate data DATA by correcting an error that is included in internal data ID after the start of a read operation. The error correction circuit 44 may generate an error information signal ER_INF if an error is included in internal data ID after the start of an ECS operation. The error correction circuit 44 may correct an error that is included in internal data ID output by the core circuit 43 after the start of an ECS operation, and may output, to the core circuit 43, the internal data ID having the error that is corrected. The error information signal ER_INF may include error-correctable information for internal data ID. For example, a case in which a 1-bit error occurs in internal data ID may indicate that the error is correctable, and a case in which an error having 2 bits or more occurs in internal data ID may indicate that the error is uncorrectable.

The ECS engine 45 may generate the ECS control signal ECS during a normal operation by using an internal counter. The ECS engine 45 may generate the ECS control signal ECS when receiving the command CMD having a logic level combination for performing an ECS operation during a normal operation. The ECS engine 45 may store first to M-th ECS addresses ECS_ADD<1:M> when receiving the error information signal ER_INF during an ECS operation. The ECS engine 45 may output, as first to M-th weak cell information WK_INF<1:M>, the first to M-th ECS addresses ECS_ADD<1:M> that are stored when the mode register read command MRR is received. The first to M-th weak cell information WK_INF<1:M> have been implemented to include the first to M-th ECS addresses ECS_ADD<1:M>, but may be implemented to include error occurrence information (e.g., 1-bit error occurrence information, 2-bit error occurrence information and error-uncorrectable information) of internal data ID. The ECS engine 45 may be implemented as the same configuration as the ECS engine 25 illustrated in FIG. 5 and performs the same operation as the ECS engine 25, and thus, a detailed description thereof is omitted.

The ECS address generation circuit 46 may generate the first to M-th ECS addresses ECS_ADD<1:M> that are sequentially up-counted when the ECS control signal ECS is received. The ECS address generation circuit 46 may output, as first to M-th ECS information ECS_INF<1:M>, the first to M-th ECS addresses ECS_ADD<1:M> that are counted when a count request signal CRQ is received. The ECS address generation circuit 46 may receive first to M-th ECS resume information ECS_RSF<1:M> when receiving the boot-up command BOOT. The ECS address generation circuit 46 may generate the first to M-th ECS addresses ECS_ADD<1:M> that are sequentially up-counted from the first to M-th ECS addresses ECS_ADD<1:M> having the same logic level combination as the first to M-th ECS resume information ECS_RSF<1:M> when receiving the ECS control signal ECS, after receiving the first to M-th ECS resume information ECS_RSF<1:M>. The ECS address generation circuit 46 may generate the first to M-th ECS information ECS_INF<1:M> based on the first to M-th ECS addresses ECS_ADD<1:M> when receiving the mode register write command MRW. The ECS address generation circuit 46 may be implemented to output the first to M-th ECS addresses ECS_ADD<1:M> as the first to M-th ECS information ECS_INF<1:M> by up-counting the first to M-th ECS addresses ECS_ADD<1:M> once. The operation of up-counting the first to M-th ECS addresses ECS_ADD<1:M> once may be for performing an ECS operation on a next location that is not the location of the memory apparatus 40 at which an ECS operation has been previously performed.

Figure 16:
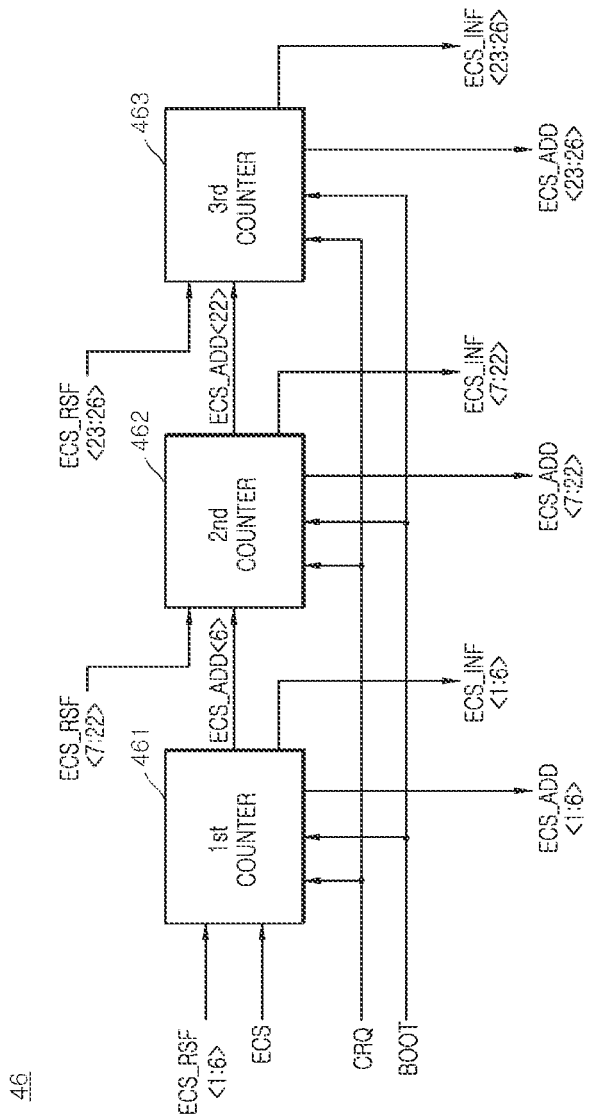
FIG. 16 is a block diagram illustrating a configuration of an ECS address generation circuit according to another embodiment of the present disclosure, which is included in the semiconductor apparatus illustrated in FIG. 15.

FIG. 16 is a block diagram illustrating a configuration of the ECS address generation circuit 46 according an embodiment, which is included in the memory apparatus 40. The ECS address generation circuit 46 may include a first counter 461, a second counter 462, and a third counter 463.

The first counter 461 may receive the ECS control signal ECS and may generate first to sixth ECS addresses ECS_ADD<1:6> that are sequentially up-counted. The first counter 461 may generate the first to sixth ECS addresses ECS_ADD<1:6> that are up-counted whenever the ECS control signal ECS is received. The first counter 461 may generate the first to sixth ECS addresses ECS_ADD<1:6> that are up-counted whenever a level of the ECS control signal ECS transitions from a logic high level to a logic low level. The first counter 461 may output, as first to sixth ECS information ECS_INF<1:6>, the first to sixth ECS addresses ECS_ADD<1:6> that are counted when the count request signal CRQ is received. The first counter 461 may receive the boot-up command BOOT and first to sixth ECS resume information ECS_RSF <1:6> and may generate the first to sixth ECS addresses ECS_ADD<1:6>. The first counter 461 may receive the first to sixth ECS resume information ECS_RSF <1:6> when receiving the boot-up command BOOT and may generate the first to sixth ECS addresses ECS_ADD<1:6> having the same logic level combination as the first to sixth ECS resume information ECS_RSF<1:6>. The first counter 461 may sequentially up-count the first to sixth ECS addresses ECS_ADD<1:6> having the same logic level combination as the first to sixth ECS resume information ECS_RSF<1:6> whenever a level of the ECS control signal ECS transitions from a logic high level to a logic low level after the boot-up command BOOT is received. The first to sixth ECS addresses ECS_ADD<1:6> may be set as bits for selecting the first to sixth bit lines BL1 to BL6 illustrated in FIG. 4.

The second counter 462 may receive the sixth ECS address ECS_ADD<6>, and may generate seventh to twenty-second ECS addresses ECS_ADD<7:22> that are sequentially up-counted. The second counter 462 may generate the seventh to twenty-second ECS addresses ECS_ADD<7:22> up-counted whenever the sixth ECS address ECS_ADD<6> is received. The second counter 462 may generate the seventh to twenty-second ECS addresses ECS_ADD<7:22> that are up-counted whenever a level of the sixth ECS address ECS_ADD<6> transitions from a logic high level to a logic low level. The second counter 462 may output, as seventh to twenty-second ECS information ECS_INF<7:22>, the seventh to twenty-second ECS addresses ECS_ADD<7:22> counted when the count request signal CRQ is received. The second counter 462 may receive the boot-up command BOOT and seventh to twenty-second ECS resume information ECS_RSF<7:22> and may generate the seventh to twenty-second ECS addresses ECS_ADD<7:22>. The second counter 462 may receive the seventh to twenty-second ECS resume information ECS_RSF<7:22> when receiving the boot-up command BOOT and may generate the seventh to twenty-second ECS addresses ECS_ADD<7:22> having the same logic level combination as the seventh to twenty-second ECS resume information ECS_RSF<7:22>. The second counter 462 may sequentially up-count the seventh to twenty-second ECS addresses ECS_ADD<7:22> having the same logic level combination as the seventh to twenty-second ECS resume information ECS_RSF<7:22> whenever a level of the sixth ECS address ECS_ADD<6> transitions from a logic high level to a logic low level after the boot-up command BOOT is received. The seventh to twenty-second ECS addresses ECS_ADD<7:22> may be set as bits for selecting the first to sixteenth word lines WL1 to WL16, illustrated in FIG. 4.

The third counter 463 may receive the twenty-second ECS address ECS_ADD<22> and may generate twenty-third to twenty-sixth ECS addresses ECS_ADD<23:26> that are sequentially up-counted. The third counter 463 may generate the twenty-third to twenty-sixth ECS addresses ECS_ADD<23:26> that are up-counted whenever the twenty-second ECS address ECS_ADD<22> is received. The third counter 463 may generate the twenty-third to twenty-sixth ECS addresses ECS_ADD<23:26> that are up-counted whenever a level of the twenty-second ECS address ECS_ADD<22> transitions from a logic high level to a logic low level. The third counter 463 may output, as twenty-third to twenty-sixth ECS information ECS_INF<23:26>, the twenty-third to twenty-sixth ECS addresses ECS_ADD<23:26> that are counted when the count request signal CRQ is received. The third counter 463 may receive the boot-up command BOOT and twenty-third to twenty-sixth ECS resume information ECS_RSF<23:26> and may generate the twenty-third to twenty-sixth ECS addresses ECS_ADD<23:26>. The third counter 463 may receive the twenty-third to twenty-sixth ECS resume information ECS_RSF<23:26> when receiving the boot-up command BOOT and may generate the twenty-third to twenty-sixth ECS addresses ECS_ADD<23:26> having the same logic level combination as the twenty-third to twenty-sixth ECS addresses ECS_ADD<23:26>. The third counter 463 may sequentially up-count the twenty-third to twenty-sixth ECS addresses ECS_ADD<23:26> having the same logic level combination as the twenty-third to twenty-sixth ECS resume information ECS_RSF<23:26> whenever a level of the twenty-second ECS address ECS_ADD<22> transitions from a logic high level to a logic low level after the boot-up command BOOT is received. The twenty-third to twenty-sixth ECS addresses ECS_ADD<23:26> may be set as bits for selecting the first to fourth banks 231 to 234 illustrated in FIG. 4.

The first to twenty-sixth ECS addresses ECS_ADD<1:26>, illustrated in FIG. 16, have been implemented as 26 bits, but may be implemented as various bits depending on a structure of the core circuit 43.

Figure 17:
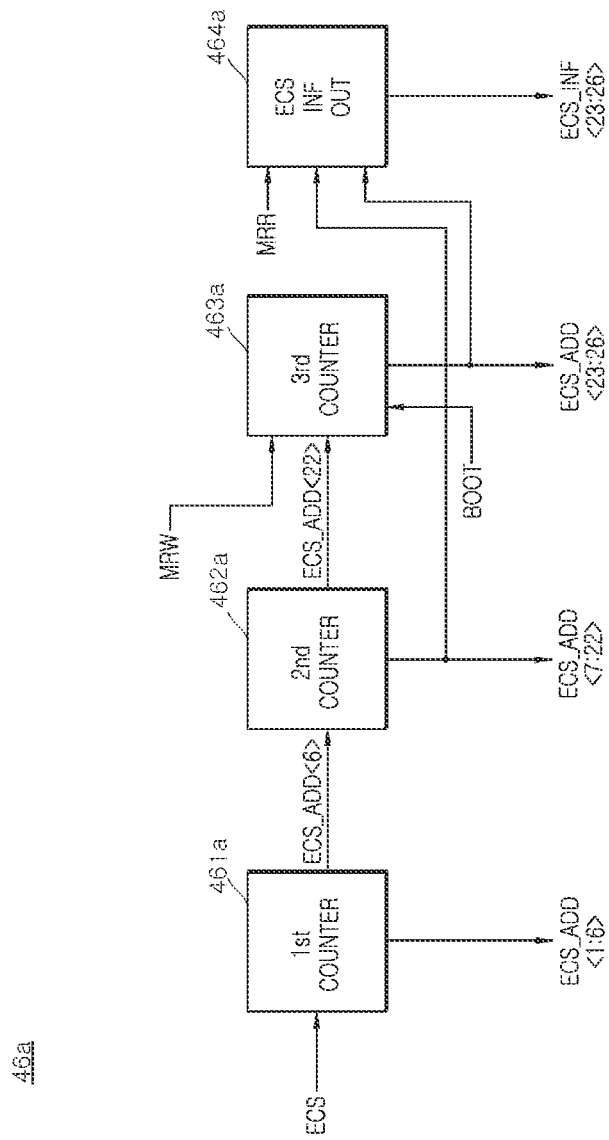
FIG. 17 is a block diagram illustrating a configuration of an ECS address generation circuit according to another embodiment of the ECS address generation circuit included in the semiconductor apparatus according to another embodiment of the present disclosure, which is illustrated in FIG. 15.

FIG. 17 is a block diagram illustrating a configuration of an ECS address generation circuit 46a according to another embodiment of the ECS address generation circuit 46 included in the memory apparatus 40. The ECS address generation circuit 46a may include a first counter 461a, a second counter 462a, a third counter 463a, and an ECS information output circuit (ECS INF OUT) 464a.

The first counter 461a may receive the ECS control signal ECS and may generate the first to sixth ECS addresses ECS_ADD<1:6> that are sequentially up-counted. The first counter 461a may generate the first to sixth ECS addresses ECS_ADD<1:6> up-counted whenever the ECS control signal ECS is received. The first counter 461a may generate the first to sixth ECS addresses ECS_ADD<1:6> that are up-counted whenever a level of the ECS control signal ECS transitions from a logic high level to a logic low level. The first to sixth ECS addresses ECS_ADD<1:6> may be set as bits for selecting the first to sixth bit lines BL1 to BL6, illustrated in FIG. 4.

The second counter 462a may receive the sixth ECS address ECS_ADD<6> and may generate the seventh to twenty-second ECS addresses ECS_ADD<7:22> that are sequentially up-counted. The second counter 462a may generate the seventh to twenty-second ECS addresses ECS_ADD<7:22> that are up-counted whenever the sixth ECS address ECS_ADD<6> is received. The second counter 462a may generate the seventh to twenty-second ECS addresses ECS_ADD<7:22> that are up-counted whenever a level of the sixth ECS address ECS_ADD<6> transitions from a logic high level to a logic low level. The seventh to twenty-second ECS addresses ECS_ADD<7:22> may be set as bits for selecting the first to sixteenth word lines WL1 to WL16, illustrated in FIG. 4.

The third counter 463a may receive the twenty-second ECS address ECS_ADD<22> and may generate the twenty-third to twenty-sixth ECS addresses ECS_ADD<23:26> that are sequentially up-counted. The third counter 463a may generate the twenty-third to twenty-sixth ECS addresses ECS_ADD<23:26> that are up-counted whenever the twenty-second ECS address ECS_ADD<22> is received. The third counter 463a may generate the twenty-third to twenty-sixth ECS addresses ECS_ADD<23:26> that are up-counted whenever a level of the twenty-second ECS address ECS_ADD<22> transitions from a logic high level to a logic low level. The third counter 463a may receive the boot-up command BOOT and the mode register write command MRW and may generate the twenty-third to twenty-sixth ECS addresses ECS_ADD<23:26>. When receiving the boot-up command BOOT, the third counter 463a may generate the twenty-third to twenty-sixth ECS addresses ECS_ADD<23:26> having an initial combination based on the number of mode register write commands MRW input to the third counter 463a. The third counter 463a may sequentially up-count the twenty-third to twenty-sixth ECS addresses ECS_ADD<23:26> having an initial combination based on the number of mode register write commands MRW input to the third counter 463a whenever a level of the twenty-second ECS address ECS_ADD<22> transitions from a logic high level to a logic low level, after the boot-up command BOOT is received. The twenty-third to twenty-sixth ECS addresses ECS_ADD<23:26> may be set as bits for selecting the first to fourth banks 231 to 234, illustrated in FIG. 4.

The ECS information output circuit 464a may receive the mode register read command MRR and the seventh to twenty-second ECS addresses ECS_ADD<7:22> and may generate the twenty-third to twenty-sixth ECS information ECS_INF<23:26> from the twenty-third to twenty-sixth ECS addresses ECS_ADD<23:26>. When all the seventh to twenty-second ECS addresses ECS_ADD<7:22> are counted and the mode register read command MRR is received, the ECS information output circuit 464a may output the twenty-third to twenty-sixth ECS addresses ECS_ADD<23:26> as the twenty-third to twenty-sixth ECS information ECS_INF<23:26>.

The first to twenty-sixth ECS addresses ECS_ADD<1:26>, illustrated in FIG. 17, have been implemented as 26 bits, but may be implemented as various bits depending on a structure of the core circuit 43.

Figure 18:
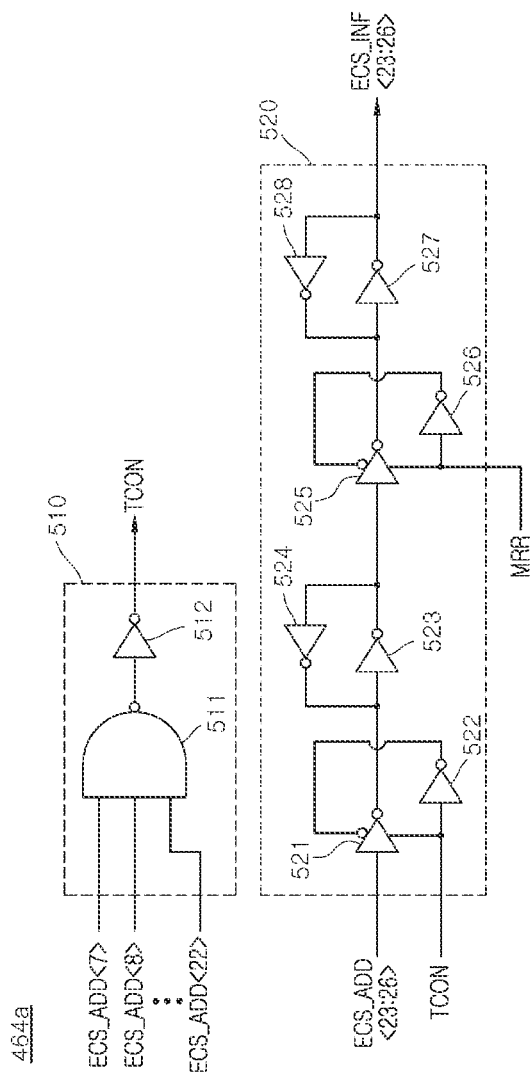
FIG. 18 is a circuit diagram illustrating a configuration of an ECS information output circuit included in the ECS address generation circuit according to another embodiment of the present disclosure, which is illustrated in FIG. 17.

FIG. 18 is a block diagram illustrating a configuration of the ECS information output circuit 464a according an embodiment, which is included in the ECS address generation circuit 46a. The ECS information output circuit 464a may include a transfer control signal generation circuit 510 and a latch circuit 520.

The transfer control signal generation circuit 510 may be implemented by using a NAND gate 511 and an inverter 512.

The transfer control signal generation circuit 510 may generate a transfer control signal TCON based on the seventh to twenty-second ECS addresses ECS_ADD<7:22>. The transfer control signal generation circuit 510 may generate the transfer control signal TCON having a logic high level when levels of all the seventh to twenty-second ECS addresses ECS_ADD<7:22> are counted as a logic high level.

The latch circuit 520 may be implemented by using inverters 521, 522, 523, 524, 525, 526, 527, and 528.

The latch circuit 520 may receive the twenty-third to twenty-sixth ECS addresses ECS_ADD<23:26> when receiving the transfer control signal TCON. The latch circuit 520 may receive the twenty-third to twenty-sixth ECS addresses ECS_ADD<23:26> when receiving the transfer control signal TCON having a logic high level and may latch the twenty-third to twenty-sixth ECS addresses ECS_ADD<23:26>. The latch circuit 520 may output, as the twenty-third to twenty-sixth ECS information ECS_INF<23:26>, the twenty-third to twenty-sixth ECS addresses ECS_ADD<23:26> that are latched when the mode register read command MRR is received. The latch circuit 520 has been illustrated as one circuit, but may be implemented by using four circuits, that is, the number of bits of the twenty-third to twenty-sixth ECS addresses ECS_ADD<23:26> and the twenty-third to twenty-sixth ECS information ECS_INF<23:26>.

Figure 19:
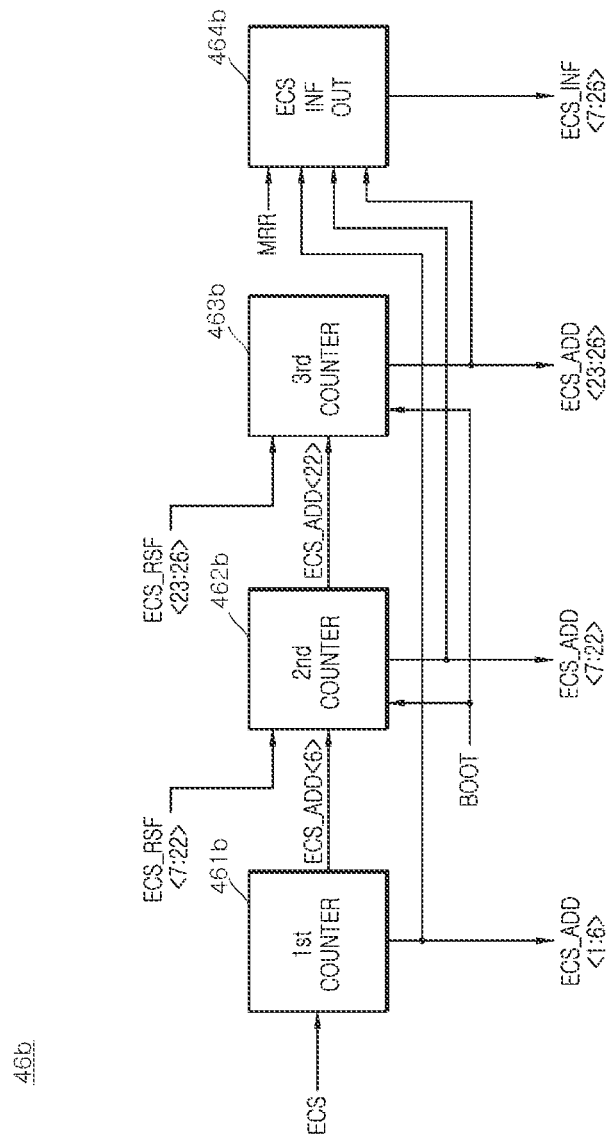
FIG. 19 is a block diagram illustrating a configuration of an ECS address generation circuit according to another embodiment of the ECS address generation circuit included in the semiconductor apparatus according to another embodiment of the present disclosure, which is illustrated in FIG. 15.

FIG. 19 is a block diagram illustrating a configuration of an ECS address generation circuit 46b according to another embodiment of the ECS address generation circuit 46 that is included in the memory apparatus 40. The ECS address generation circuit 46b may include a first counter 461b, a second counter 462b, a third counter 463b, and an ECS information output circuit (ECS INF OUT) 464b.

The first counter 461b may receive the ECS control signal ECS and may generate the first to sixth ECS addresses ECS_ADD<1:6> that are sequentially up-counted. The first counter 461b may generate the first to sixth ECS addresses ECS_ADD<1:6> that are up-counted whenever the ECS control signal ECS is received. The first counter 461b may generate the first to sixth ECS addresses ECS_ADD<1:6> that are up-counted whenever a level of the ECS control signal ECS transitions from a logic high level to a logic low level. The first to sixth ECS addresses ECS_ADD<1:6> may be set as bits for selecting the first to sixth bit lines BL1 to BL6 illustrated in FIG. 4.

The second counter 462b may receive the sixth ECS address ECS_ADD<6> and may generate the seventh to twenty-second ECS addresses ECS_ADD<7:22> that are sequentially up-counted. The second counter 462b may generate the seventh to twenty-second ECS addresses ECS_ADD<7:22> that are up-counted whenever the sixth ECS address ECS_ADD<6> is received. The second counter 462b may generate the seventh to twenty-second ECS addresses ECS_ADD<7:22> that are up-counted whenever a level of the sixth ECS address ECS_ADD<6> transitions from a logic high level to a logic low level. The second counter 462b may receive the boot-up command BOOT and the seventh to twenty-second ECS resume information ECS_RSF<7:22> and may generate the seventh to twenty-second ECS addresses ECS_ADD<7:22>. The second counter 462b may receive the seventh to twenty-second ECS resume information ECS_RSF<7:22> when receiving the boot-up command BOOT and may generate the seventh to twenty-second ECS addresses ECS_ADD<7:22> having the same logic level combination as the seventh to twenty-second ECS resume information ECS_RSF<7:22>. After the boot-up command BOOT is received, the second counter 462b may sequentially up-count the seventh to twenty-second ECS addresses ECS_ADD<7:22> having the same logic level combination as the seventh to twenty-second ECS resume information ECS_RSF<7:22> whenever a level of the sixth ECS address ECS_ADD<6> transitions from a logic high level to a logic low level. The seventh to twenty-second ECS addresses ECS_ADD<7:22> may be set as bits for selecting the first to sixteenth word lines WL1 to WL16, illustrated in FIG. 4.

The third counter 463a may receive the twenty-second ECS address ECS_ADD<22> and may generate the twenty-third to twenty-sixth ECS addresses ECS_ADD<23:26> that are sequentially up-counted. The third counter 463a may generate the twenty-third to twenty-sixth ECS addresses ECS_ADD<23:26> that are up-counted whenever the twenty-second ECS address ECS_ADD<22> is received. The third counter 463a may generate the twenty-third to twenty-sixth ECS addresses ECS_ADD<23:26> that are up-counted whenever a level of the twenty-second ECS address ECS_ADD<22> transitions from a logic high level to a logic low level. The third counter 463a may receive the boot-up command BOOT and the twenty-third to twenty-sixth ECS resume information ECS_RSF<23:26> and may generate the twenty-third to twenty-sixth ECS addresses ECS_ADD<23:26>. The third counter 463a may receive the twenty-third to twenty-sixth ECS resume information ECS_RSF<23:26> when receiving the boot-up command BOOT and may generate the twenty-third to twenty-sixth ECS addresses ECS_ADD<23:26> having the same logic level combination as the twenty-third to twenty-sixth ECS resume information ECS_RSF<23:26>. After the boot-up command BOOT is received, the third counter 463a may sequentially up-count the twenty-third to twenty-sixth ECS addresses ECS_ADD<23:26> having the same logic level combination as the twenty-third to twenty-sixth ECS resume information ECS_RSF<23:26> whenever a level of the twenty-second ECS address ECS_ADD<22> transitions from a logic high level to a logic low level. The twenty-third to twenty-sixth ECS addresses ECS_ADD<23:26> may be set as bits for selecting the first to fourth banks 231 to 234, illustrated in FIG. 4.

The ECS information output circuit 464b may receive the mode register read command MRR and the first to sixth ECS addresses ECS_ADD<1:6> and may generate the seventh to twenty-sixth ECS information ECS_INF<7:26> from the seventh to twenty-sixth ECS addresses ECS_ADD<7:26>. When all the first to sixth ECS addresses ECS_ADD<1:6> are counted and the mode register read command MRR is received The ECS information output circuit 464b may output the seventh to twenty-sixth ECS addresses ECS_ADD<7:26> as the seventh to twenty-sixth ECS information ECS_INF<7:26>.

The first to twenty-sixth ECS addresses ECS_ADD<1:26>, illustrated in FIG. 19, have been implemented as 26 bits, but may be implemented as various bits depending on a structure of the core circuit 43.

Figure 20:
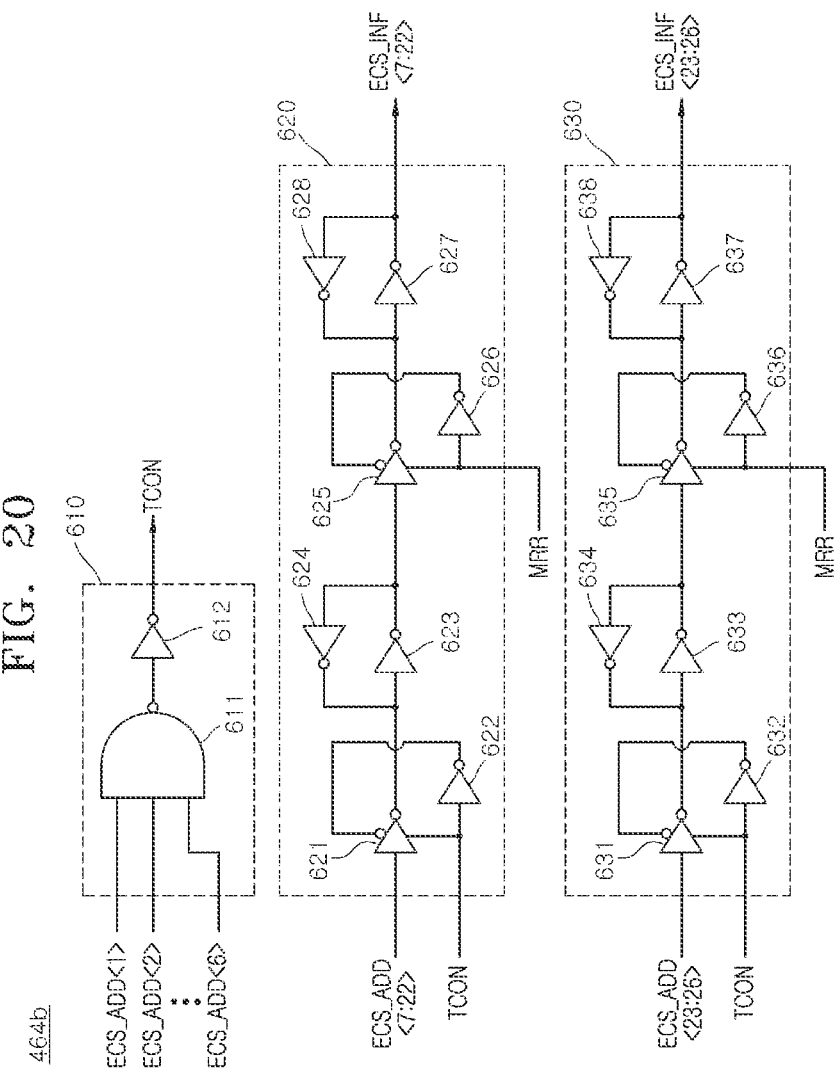
FIG. 20 is a circuit diagram illustrating a configuration of an ECS information output circuit included in the ECS address generation circuit according to another embodiment of the present disclosure, which is illustrated in FIG. 19.

FIG. 20 is a block diagram illustrating a configuration of the ECS information output circuit 464b according an embodiment, which is included in the ECS address generation circuit 46b. The ECS information output circuit 464b may include a transfer control signal generation circuit 610, a first latch circuit 620, and a second latch circuit 630.

The transfer control signal generation circuit 610 may be implemented by using a NAND gate 611 and an inverter 612.

The transfer control signal generation circuit 610 may generate the transfer control signal TCON based on the first to sixth ECS addresses ECS_ADD<1:6>. The transfer control signal generation circuit 610 may generate the transfer control signal TCON having a logic high level when levels of the first to sixth ECS addresses ECS_ADD<1:6> are all counted as a logic high level.

The first latch circuit 620 may be implemented using inverters 621, 622, 623, 624, 625, 626, 627, and 628.

The first latch circuit 620 may receive the seventh to twenty-second ECS addresses ECS_ADD<7:22> when receiving the transfer control signal TCON. The first latch circuit 620 may receive the seventh to twenty-second ECS addresses ECS_ADD<7:22> when receiving the transfer control signal TCON having a logic high level and may latch the seventh to twenty-second ECS addresses ECS_ADD<7:22>. The first latch circuit 620 may output, as the seventh to twenty-second ECS information ECS_INF<7:22>, the seventh to twenty-second ECS addresses ECS_ADD<7:22> that are latched when the mode register read command MRR is received. The first latch circuit 620 has been illustrated as only one circuit, but may be implemented as sixteen circuits, that is, the number of bits of the seventh to twenty-second ECS addresses ECS_ADD<7:22> and the seventh to twenty-second ECS information ECS_INF<7:22>.

The second latch circuit 630 may be implemented inverters 631, 632, 633, 634, 635, 636, 637, and 638.

The second latch circuit 630 may receive the twenty-third to twenty-sixth ECS addresses ECS_ADD<23:26> when receiving the transfer control signal TCON. The second latch circuit 630 may receive the twenty-third to twenty-sixth ECS addresses ECS_ADD<23:26> when receiving the transfer control signal TCON having a logic high level and may latch the twenty-third to twenty-sixth ECS addresses ECS_ADD<23:26>. The second latch circuit 630 may output, as the twenty-third to twenty-sixth ECS information ECS_INF<23:26>, the twenty-third to twenty-sixth ECS addresses ECS_ADD<23:26> that are latched when the mode register read command MRR is received. The second latch circuit 630 has been illustrated as only one circuit, but may be implemented as four circuits, that is, the number of bits of the twenty-third to twenty-sixth ECS addresses ECS_ADD<23:26> and the twenty-third to twenty-sixth ECS information ECS_INF<23:26>.

An ECS operation of the semiconductor system 2 according to another embodiment of the present disclosure is the same as the ECS operation of the semiconductor system 1, described with reference to FIGS. 7 to 9, except that the ECS information is output from the memory apparatus 40 to the controller 30 and stored in the controller 30 and the ECS storage address, that is, location information for performing the ECS operation based on the stored ECS information, is output to the memory apparatus 40, and thus, a detailed description thereof is omitted.

Figure 21:
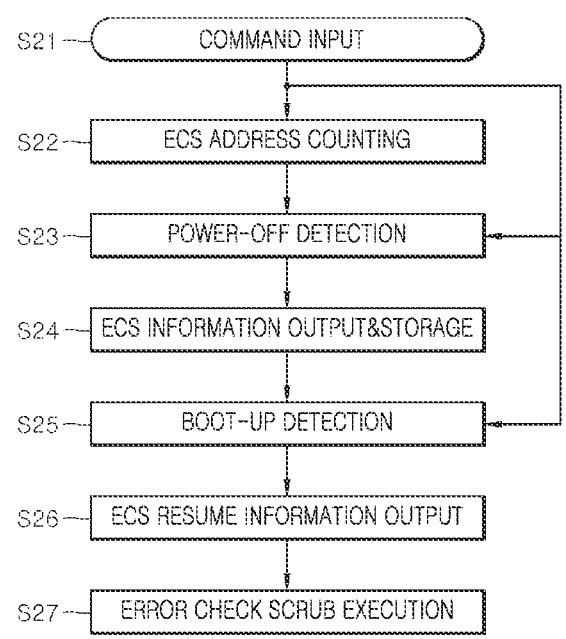
FIG. 21 is a flowchart for describing an ECS operation method according to another embodiment of the present disclosure.

FIG. 21 is a flowchart for describing an ECS operation method according to another embodiment of the present disclosure. The ECS operation method may include a command input step S21, an ECS address counting step S22, a power-off detection step S23, an ECS information output and storage step S24, a boot-up detection step S25, an ECS resume information output step S26, and an ECS operation execution step S27.

The command input step S21 may be configured as a step of generating, by the command generation circuit 31 of the controller 30, the command CMD for performing an ECS operation of the memory apparatus 40. In the command input step S21, the command generation circuit 31 of the controller 30 may output, to the memory apparatus 40, the command CMD for performing the ECS operation. In the command input step S21, the ECS engine 45 of the memory apparatus 40 may generate the ECS control signal ECS by decoding the command CMD.

The ECS address counting step S22 may be configured as a step of sequentially counting the first to M-th ECS addresses ECS_ADD<1:M> for performing the ECS operation. In the ECS address counting step S22, the ECS address generation circuit 46 of the memory apparatus 40 may sequentially up-count the first to M-th ECS addresses ECS_ADD<1:M> whenever the ECS control signal ECS is received.

The power-off detection step S23 may be configured as a step of generating, by the command generation circuit 31 of the controller 30, the count request signal CRQ before a power-off operation of the memory apparatus 40. In the power-off detection step S23, the memory apparatus 40 may receive the count request signal CRQ.

The ECS information output and storage step S24 may be configured as a step of outputting, by the memory apparatus 40, the first to M-th ECS information ECS_INF<1:M> to the controller 30 so that the first to M-th ECS information ECS_INF<1:M> is stored in the storage circuit 33, that is, a non-volatile apparatus, after the start of a power-off operation. In the ECS information output and storage step S24, the ECS address generation circuit 46 of the memory apparatus 40 may output, as the first to M-th ECS information ECS_INF<1:M>, the first to M-th ECS addresses ECS_ADD<1:M> that are counted when the count request signal CRQ is received. In the ECS information output and storage step S24, the storage circuit 33 of the controller 30 may store the first to M-th ECS information ECS_INF<1:M> when receiving the power-off control signal PWO that is generated after the start of a power-off operation.

The boot-up detection step S25 may be configured as a step of generating, by the command generation circuit 31 of the controller 30, the command CMD for performing a boot-up operation of the memory apparatus 40. In the boot-up detection step S25, the command decoder 41 of the memory apparatus 40 may generate the boot-up command BOOT by decoding the command CMD.

The ECS resume information output step S26 may be configured as a step of outputting, as the first to M-th ECS resume information ECS_RSF<1:M>, the first to M-th ECS information ECS_INF<1:M> that is stored after the start of a boot-up operation. In the ECS resume information output step S26, the storage circuit 33 of the controller 30 may output, as the first to M-th ECS resume information ECS_RSF<1:M>, the first to M-th ECS information ECS_INF<1:M> that is stored when the boot-up control signal BTC generated after the start of a boot-up operation is received. In the ECS resume information output step S26, the ECS address generation circuit 46 of the memory apparatus 40 may receive the first to M-th ECS resume information ECS_RSF<1:M> when receiving the boot-up command BOOT.

The ECS operation execution step S27 may be configured as a step of performing an ECS operation from a location of the memory apparatus 40 at which an ECS operation has been previously performed based on the first to M-th ECS resume information ECS_RSF<1:M>. In the ECS operation execution step S27, the command generation circuit 31 of the controller 30 may generate the command CMD for performing an ECS operation of the memory apparatus 40. In the ECS operation execution step S27, the ECS engine 45 of the memory apparatus 40 may generate the ECS control signal ECS by decoding the command CMD. In the ECS operation execution step S27, when receiving the ECS control signal ECS, the ECS address generation circuit 46 of the memory apparatus 40 may generate the first to M-th ECS addresses ECS_ADD<1:M> that are sequentially up-counted from the first to M-th ECS addresses ECS_ADD<1:M> having the same logic level combination as the first to M-th ECS resume information ECS_RSF<1:M> that is received after the start of a boot-up operation. In the ECS operation execution step S27, when receiving the ECS control signal ECS, the core circuit 43 may store internal data ID, the error of which has been corrected, after outputting internal data ID that is stored at a location that is selected by the first to M-th ECS addresses ECS_ADD<1:M>.

Such an ECS operation method of the present disclosure can prevent an ECS operation from being repeated only at a specific address or being omitted at some addresses in a way to perform an ECS operation from a location of a memory apparatus at which an ECS operation has been previously performed by storing, in a non-volatile apparatus, a location of the memory apparatus at which an ECS operation has been performed before a power-off operation and providing the memory apparatus with a location of the memory apparatus at which an ECS operation has been performed and which has been stored after the start of a boot-up operation. Furthermore, the ECS operation method can secure the reliability of data that is stored in the core circuit by performing an ECS operation from a location of the memory apparatus at which an ECS operation has been previously performed after the start of an ECS operation.

What is claimed is:

1. A semiconductor system comprising:
a controller configured to count a number of error check scrub (ECS) operations and configured to generate ECS information comprising information with regard to an address at which the ECS operation is to be performed based on the number of ECS operations; and
a memory apparatus configured to perform the ECS operation on a region that is selected by the ECS information, and
wherein the controller is configured to store the number of ECS operations before a power-off operation, and output the ECS information that is stored in the controller to the memory apparatus after a start of a boot-up operation.

2. The semiconductor system of claim 1, wherein the memory apparatus is configured to perform the ECS operation on a selected bank, among multiple banks, based on the ECS information after the start of the boot-up operation.

3. The semiconductor system of claim 1, wherein the memory apparatus is configured to perform the ECS operation on a selected address, among multiple addresses, based on the ECS information after the start of the boot-up operation.

4. The semiconductor system of claim 1, wherein the controller comprises an ECS command counting circuit configured to:
count the number of ECS operations based on a command,
store the number of ECS operations in a storage circuit based on a power-off control signal, and
generate the ECS information comprising the address information by using the number of ECS operations that are received from the storage circuit based on a boot-up control signal.

5. The semiconductor system of claim 4, wherein the storage circuit is configured to be disposed inside or outside of the controller and configured to maintain the number of ECS operations that are stored even after power-off of the memory apparatus.

6. The semiconductor system of claim 1, wherein the ECS information is generated as one of the number of ECS operations and an address at which the ECS operation is to be started, the ECS information being calculated based on the number of ECS operations.

7. The semiconductor system of claim 1, wherein the memory apparatus comprises:
an ECS engine configured to generate an ECS control signal by decoding a command that is received from the controller;
an ECS address generation circuit configured to:
generate an ECS address for the ECS operation based on the ECS information after the start of the boot-up operation,
receive the ECS control signal, and
sequentially increase the ECS address; and
a core circuit comprising multiple banks, each comprising a selected region, and configured to perform the ECS operation on the selected region of a selected bank, among the multiple banks, based on the ECS control signal and the ECS address.

8. The semiconductor system of claim 7, wherein the core circuit is configured to:
perform the ECS operation on a region of a first row address of the selected bank when the ECS address comprises only a bank address for selecting the bank, and
perform the ECS operation on a region of a first column address of the selected row address in the bank when the ECS address comprises only the bank address and the row address.

9. The semiconductor system of claim 1, wherein the controller further comprises a weak cell analysis circuit configured to manage a failure that occurs in the memory apparatus based on weak cell information that is received from the memory apparatus after a start of a mode register read operation.

10. The semiconductor system of claim 9, wherein:
the memory apparatus comprises an ECS engine configured to store a specific row address and error occurrence information in a mode register as the weak cell information when a fail count that occurs in the row address is greater than a threshold value upon ECS operation, and further comprises a mode register configured to transmit the weak cell information to the controller after the start of the mode register read operation.

11. A semiconductor system comprising:
a controller configured to:
  receive error check scrub (ECS) information from a memory apparatus,
  store the ECS information, and
  generate ECS resume information comprising address information on which an ECS operation is to be performed based on the ECS information; and
a memory apparatus configured to:
  generate the ECS information comprising information with regard to an address at which the ECS operation has been performed based on a command, and
  sequentially perform the ECS operation from a region that is selected by the ECS resume information, and
  wherein the controller is configured to transmit a count request signal to the memory apparatus before an execution of a power-off operation,
  request the ECS information,
  receive and store the ECS information, and
  wherein the controller is configured to output the ECS resume information to the memory apparatus after a start of a boot-up operation.

12. The semiconductor system of claim 11, wherein the memory apparatus is configured to perform the ECS operation on a selected bank, among multiple banks, based on the ECS resume information after the start of the boot-up operation.

13. The semiconductor system of claim 11, wherein:
the controller is configured to store the ECS information in a storage circuit, and
the storage circuit is disposed inside or outside of the controller and configured to maintain the ECS information even after a start of the power-off operation of the memory apparatus.

14. The semiconductor system of claim 11, wherein the memory apparatus comprises:
an ECS engine configured to generate an ECS control signal by decoding a command that is received from the controller;
an ECS address generation circuit configured to:
  sequentially increase and store an ECS address based on the ECS control signal,
  transmit, to the controller, the ECS information that is generated from the ECS address in response to the count request signal,
  generate an ECS address for the ECS operation based on the ECS control signal and the ECS resume information after the start of the boot-up operation, and
  sequentially increase the ECS address by receiving the ECS control signal; and
a core circuit comprising multiple banks each comprising a selected region, and configured to perform the ECS operation on the selected region of a selected bank, among the multiple banks, based on the ECS control signal and the ECS address.

15. The semiconductor system of claim 14, wherein the ECS address generation circuit is configured to:
generate the ECS address as a first row address of the selected bank when the ECS address that is generated based on the ECS resume information does not comprise a row address, and
generate the ECS address as a first column address of the selected bank and a selected row address when the ECS address does not comprise a column address.

16. An error check scrub (ECS) operation method comprising:
performing, by a memory apparatus, an ECS operation and storing, in a controller, ECS information comprising information with regard to an address at which the ECS operation has been performed before an end of a power-off operation; and
performing, by the memory apparatus, the ECS operation on a selected region, based on the ECS information, after a start of a boot-up operation, and
wherein the controller is configured to output the ECS information that is stored in the controller to the memory apparatus after the start of the boot-up operation.

17. The ECS operation method of claim 16, wherein the memory apparatus is configured to:
generate an ECS address based on the ECS information after the start of the boot-up operation, and
perform the ECS operation while sequentially increasing the ECS address.

18. The ECS operation method of claim 16, wherein the controller is configured to generate the ECS information as one of a number of ECS operations and an address which is calculated based on the number of ECS operations and at which the ECS operation is to be started.

19. An error check scrub (ECS) operation method comprising:
performing, by a memory apparatus, an ECS operation and transmitting, to a controller, ECS information comprising information with regard to an address at which the ECS operation has been performed before an end of a power-off operation; and
outputting, to the memory apparatus, ECS resume information that is generated based on the ECS information stored in the controller and performing the ECS operation after a completion of a boot-up operation of the memory apparatus based on the ECS resume information, and
wherein the controller is configured to transmit a count request signal to the memory apparatus before an execution of the power-off operation,
request the ECS information,
receive and store the ECS information, and
wherein the controller is configured output the ECS resume information to the memory apparatus after the start of the boot-up operation.

20. The ECS operation method of claim 19, wherein:
when an ECS address that is generated based on the ECS resume information does not comprise a row address, the ECS address is generated as a first row address of the selected bank, and
when the ECS address does not comprise a column address, the ECS address is generated as a first column address of the selected bank and a selected row address.

21. The ECS operation method of claim 19, wherein the memory apparatus is configured to:
transmit the ECS information to the controller in response to the count request signal that is received from the controller, and
sequentially perform the ECS operation on a selected bank of one or more banks based on the ECS resume information after a start of an ECS operation.

* * * * *